United States Patent [19]
Kochi

[11] Patent Number: 5,630,019
[45] Date of Patent: May 13, 1997

[54] WAVEFORM EVALUATING APPARATUS USING NEURAL NETWORK

[75] Inventor: Nobuo Kochi, Tokyo, Japan

[73] Assignee: Kabushiki Kaisha Topcon, Tokyo, Japan

[21] Appl. No.: 454,407

[22] Filed: May 30, 1995

Related U.S. Application Data

[63] Continuation of Ser. No. 66,521, May 24, 1993, abandoned.

[30] Foreign Application Priority Data

| May 23, 1992 | [JP] | Japan | 4-155984 |
| May 23, 1992 | [JP] | Japan | 4-155985 |
| Jan. 29, 1993 | [JP] | Japan | 5-034040 |

[51] Int. Cl.$^6$ .................................................. G06F 15/18
[52] U.S. Cl. ............................... 395/22; 395/23; 395/24
[58] Field of Search ............................. 395/22, 23, 24

[56] References Cited

U.S. PATENT DOCUMENTS

| 5,003,490 | 3/1991 | Castelaz | 395/22 |
| 5,031,154 | 7/1991 | Watanabe | 395/22 |
| 5,092,343 | 3/1992 | Spitzer et al. | 395/22 |
| 5,093,792 | 3/1992 | Taki et al. | 395/22 |
| 5,121,443 | 6/1992 | Tomlinson | 395/22 |
| 5,129,039 | 7/1992 | Hiraiwa | 395/24 |
| 5,140,523 | 8/1992 | Frankel et al. | 395/22 |
| 5,150,323 | 9/1992 | Castelaz | 395/24 |
| 5,153,439 | 10/1992 | Gozani et al. | 395/22 |
| 5,175,793 | 12/1992 | Sakamoto et al. | 395/2 |
| 5,181,171 | 1/1993 | McCormack | 395/22 |
| 5,182,794 | 1/1993 | Gasperi et al. | 395/23 |
| 5,185,848 | 2/1993 | Aritsuka et al. | 395/2 |
| 5,204,872 | 4/1993 | Staib et al. | 395/23 |
| 5,253,329 | 10/1993 | Villarreal et al. | 395/24 |
| 5,265,192 | 11/1993 | McCormack | 395/22 |
| 5,272,723 | 12/1993 | Kimoto et al. | 364/724.19 |
| 5,280,564 | 1/1994 | Shiomi et al. | 395/23 |
| 5,311,421 | 5/1994 | Nomura et al. | 395/11 |
| 5,333,240 | 7/1994 | Matsumoto et al. | 395/23 |

*Primary Examiner*—George B. Davis
*Attorney, Agent, or Firm*—Brumbaugh, Graves, Donohue & Raymond

[57] ABSTRACT

Disclosed is a waveform evaluating apparatus for evaluating and adjusting a waveform measured by a measurement apparatus such as a synchroscope and, more particularly, a waveform evaluating apparatus having a plurality of neural network modules formed independently for each object of judgment, in which the neural weight ratio of each neural network module is determined by causing the module to learn with a first ideal waveform module as an ideal signal and the like. Such an arrangement is also made, in which a signal in phase with the learned teacher signal extracted from the signal from an object of judgment signal is input to the input layer, and in which phasic information is detected in a phase detecting portion and a waveform is sliced in a waveform slicing portion on the basis of the phasic information. Further, such an arrangement is made, in which signal waveform data as an object of evaluation is input to the input layer and an analog output is output from the output layer. Therefore, waveform adjustments can also be achieved by causing the module to learn with a waveform to be adjusted.

2 Claims, 22 Drawing Sheets

[DEFICIENCY DETECTION]

FIRST IDEAL WAVEFORM MODULE

PRIMARY SECOND IDEAL WAVEFORM MODULE

SECONDARY SECOND IDEAL WAVEFORM MODULE

UNDESIRED WAVEFORM

FIRST IDEAL WAVEFORM MODULE

SECOND IDEAL WAVEFORM

UNDESIRED WAVEFORM

[PHASE DETECTING]

FIRST IDEAL WAVEFORM MODULE

PRIMARY SECOND IDEAL WAVEFORM MODULE

LAGGING 45°

SECONDARY SECOND IDEAL WAVEFORM MODULE

LEADING 45°

| | AMPLITUDE | PHASE | SHARP 1 | SHARP 2 | NOISE | MAX VALUE | ... |
|---|---|---|---|---|---|---|---|
| WAVEFORM 1 | 0.8 | 0.2 | 0.5 | 0.9 | 0.8 | 0.6 | |
| WAVEFORM 2 | 0.1 | 0.9 | 0.9 | 0.4 | 0.2 | 0.3 | |
| WAVEFORM 3 | 0.9 | 0.9 | 0.1 | 0.6 | 0.8 | 0.9 | |
| ... | ... | ... | ... | ... | ... | ... | |

FIG. 11

GOOD WAVEFORM

WAVEFORM TO BE JUDGED GOOD OR NOT

COLLECTED WAVEFORM

| | AMPLITUDE | SHARP 1 | SHARP 2 | NOISE | MAX VALUE | - - - |
|---|---|---|---|---|---|---|
| WAVEFORM 1 | 0.8 | 0.5 | 0.9 | 0.8 | 0.6 | |
| WAVEFORM 2 | 0.1 | 0.9 | 0.4 | 0.2 | 0.3 | |
| WAVEFORM 3 | 0.9 | 0.1 | 0.6 | 0.8 | 0.9 | |
| - - - | | | | | - - - | |

FIG. 17

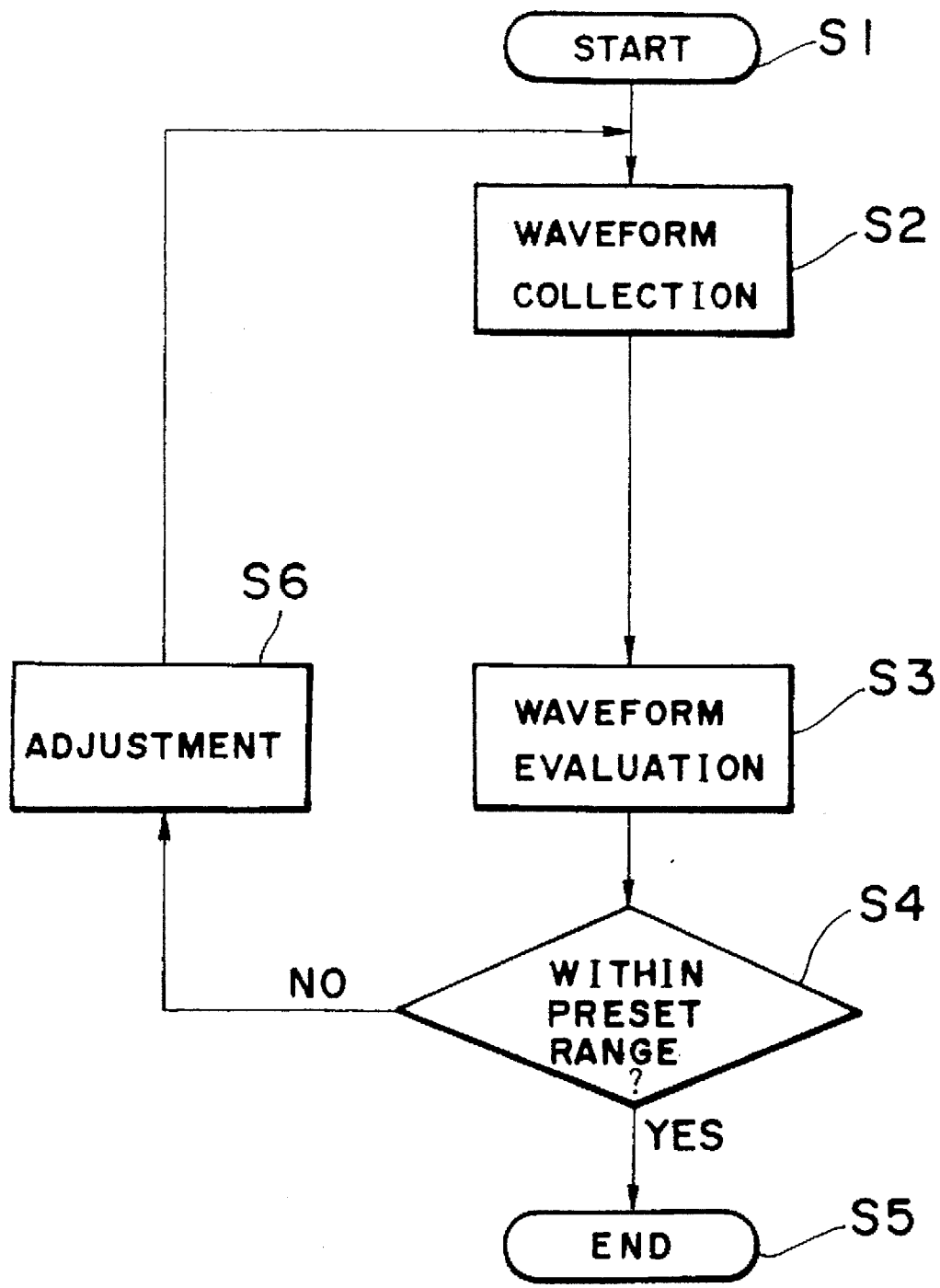

[PHASE DETECTING]

FIRST IDEAL WAVEFORM MODULE

PRIMARY SECOND IDEAL WAVEFORM MODULE

LAGGING 45°

SECONDARY SECOND IDEAL WAVEFORM MODULE

LEADING 45°

WAVEFORM EVALUATING APPARATUS USING NEURAL NETWORK

This application is a continuation of application Ser. No. 08/066,521, filed on May 24, 1993, now abandoned.

BACKGROUND OF THE INVENTION

The present invention relates to a waveform evaluating apparatus for evaluating waveforms measured by a synchroscope or such a measuring apparatus and more particularly to a waveform evaluating apparatus using a neural network in which a plurality of neural network modules are independently provided for each of objects of judgment and neural weight ratios thereof are determined by causing them to learn with a first ideal waveform module being an ideal signal and a second ideal waveform module corresponding to an element as the object of judgment.

Further, the present invention relates to a waveform evaluating apparatus capable of quantitatively evaluating a change in waveform made during an environmental test, by performing a waveform adjustment using a neural network. Furthermore, the present invention relates to a waveform evaluating apparatus most suited for use in inspecting apparatuses for inspecting good or bad quality and the like for example of printed circuit boards.

In the past, for evaluating a waveform measured by a synchroscope or the like, there were only such ways as to use programs or the like prepared in conformity with the shape of the waveform or that in which an observer evaluates the waveform by visual examination. Further, to adjust the waveform, there was only a way in which an observer adjusts the waveform while visually checking it.

In the evaluation of waveforms by means of programs or the like, since the waveform assumes a variety of shapes, there was such a problem that the evaluating programs had to be prepared for each of the waveforms and this was quite troublesome. Further, it was a problem that such a program was not usable for general purposes and poor in efficiency. Furthermore, in the case of evaluation of analog waveforms, there was a problem that it was difficult to describe the evaluation in programs, while, in the evaluation of them by visual examination, it was a problem that personal error was produced from observer to observer and, hence, a quantitative evaluation was impossible.

Besides, an electric signal waveform obtained from an object of judgment is composed of a variety of elements, and in such elements there are those serving as the objects of waveform evaluation and also those unnecessary for the evaluation.

In the case of an analog waveform including a large quantity of noise components such as random noises N1, high-frequency noises N2, and the like as shown in FIG. 25, adjustment and evaluation of the waveform was difficult and considerable personal errors were produced depending on observers, and it was difficult to achieve a quantitative evaluation.

Accordingly, there have been great demands for a waveform evaluating apparatus not requiring description of programs, capable of evaluating any types of waveform even if they include great quantities of noises, free of personal error, and capable of numerically expressing the quantities for adjustments.

BRIEF DESCRIPTION OF THE DRAWINGS

The drawings are for showing embodiments of the present invention, of which

FIG. 11 is a diagram explanatory of the second variation of the first embodiment;

FIG. 17 is a diagram explanatory of a second variation of the second embodiment;

FIG. 23 is a flow chart explanatory of the adjusting and evaluating operations performed by the waveform evaluating apparatus 1 of the third embodiment;

DETAILED DESCRIPTION OF THE EMBODIMENTS

An embodiment of the present invention will be described below with reference to the accompanying drawings.

[First Embodiment]

Figure 1:
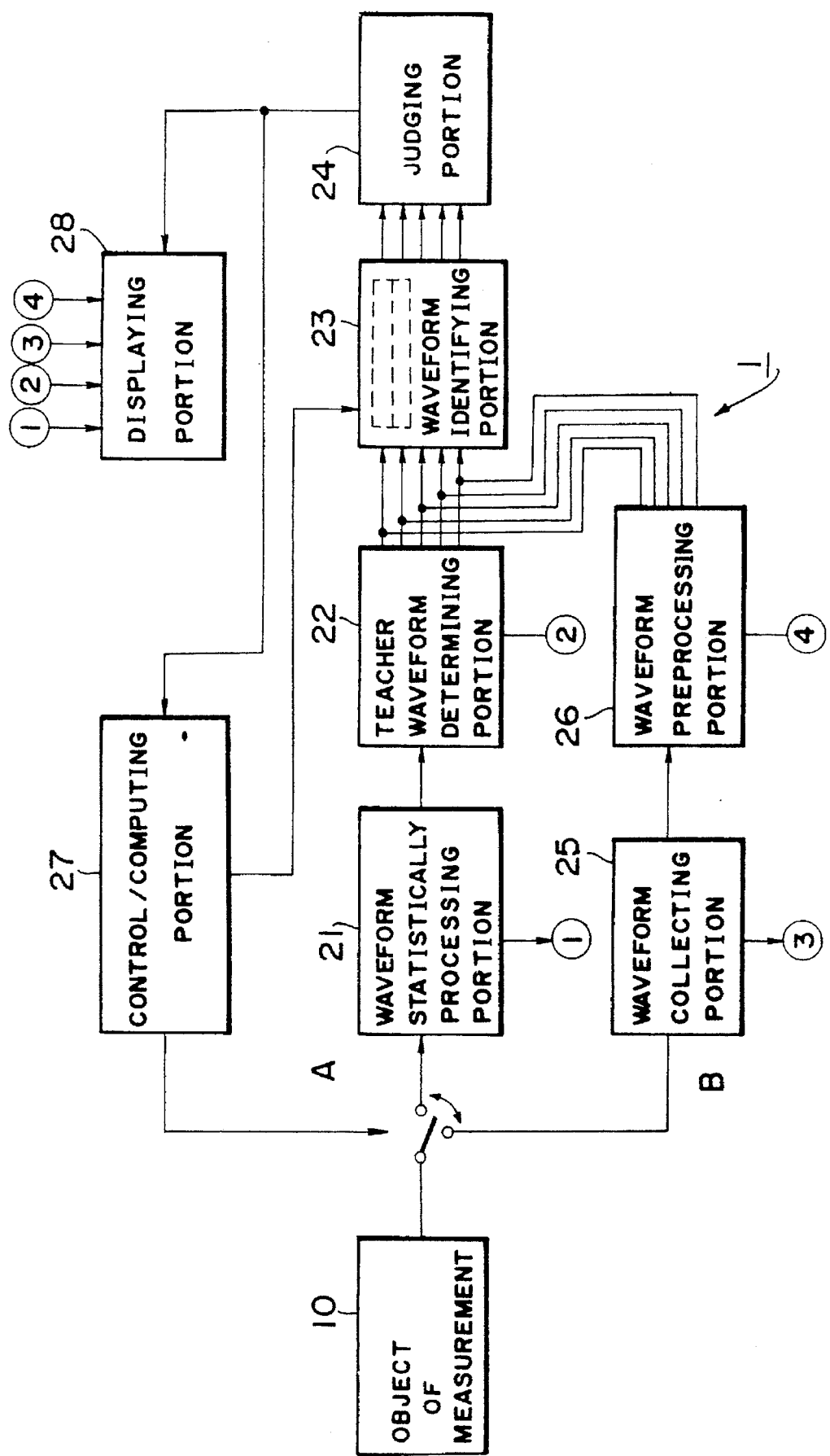
FIG. 1 is a diagram showing structure of a first embodiment of the present invention.

A first embodiment of the present invention applied to a waveform evaluating apparatus 1 for determining whether the quality of a waveform is good or bad will be described below. As shown in FIG. 1, the waveform evaluating apparatus 1 of the present embodiment is formed of a training conducting system A and a waveform evaluating system B, of which the training conducting system A is a system in which a signal from an object of judgment 10 is led, through a waveform statistically processing portion 21, a teacher waveform determining portion 22, and a waveform identifying portion 23, to a judging portion 24, while the waveform evaluating system B is a system in which the signal from the object of judgment 10 is led, through a waveform collecting portion 25, a waveform preprocessing portion 26, and the waveform identifying portion 23, to the judging portion 24. The object of judgment 10 is an apparatus as the object of measurement outputting a signal whose waveform is to be evaluated.

The waveform statistically processing portion 21 is a unit for sequentially collecting waveform data from the object of measurement 10 and statistically processing the waveform data to generate an ideal waveform. More specifically, the waveform statistically processing portion 21 has a statistically processing function and a collecting function for collecting only desired waveforms and is provided with capabilities of waveform slicing, waveform expanding, waveform contracting, waveform partially expanding, waveform partially contracting, changing the shape of waveform, etc. By means of such capabilities, it is achieved to smoothly generate a suitable teacher waveform facilitating the extraction of characteristics of waveform from the collected waveform data.

The teacher waveform determining portion 22 is a unit for determining, in accordance with elements of characteristics of a waveform identified by the waveform identifying portion 23, a first ideal waveform module based on an ideal waveform, a primary second ideal waveform module, and a secondary second ideal waveform module, for each element of characteristics, and outputting the signals thus determined to the input layer of each of neural network modules.

The waveform identifying portion 23 has independent neural network modules corresponding, in number, to the elements of characteristics to be identified. The elements of characteristics of a waveform include, for example, deficiency, phase, amplitude, and period. The waveform identifying portion 23 is adapted to determine the neural weight ratio in the course of learning and to make a judgment on the waveform in the course of judgment.

The judging portion 24 is a unit for making a synthetic judgment according to the results of identification made in the waveform identifying portion 23, and the results of judgment are adapted to be delivered to a control/computing portion 27 and a displaying portion 28.

The waveform collecting portion 25 is a unit for collecting waveforms from the object of measurement 10 and the waveform preprocessing portion 26 is a unit for performing the preprocessing of the waveform such as slicing, expanding, and contracting.

The control/computing portion 27 is a unit for switching the input waveform signal between the training conducting system A and the waveform evaluating system B. The displaying portion 28 is a unit for displaying the results of judgment made in the judging portion 24.

Below will be described a structure of a multilayer neural network constituting the neural network used in the present embodiment.

The neural network is formed of a plurality of neurons, and one neuron is made up of a neuronal body, a dendrite (signal inputting portion), and an axis cylinder (signal outputting portion). The axis cylinder (signal outputting portion) is synaptically connected with dendrites of other neurons, and thereby a network is structured.

The method of learning made by the neural network is that called the back propagation. The neural network is of a multilayer structure formed of an input layer, an intermediate layer, and an output layer.

The back propagation adopted in the learning of the multilayer neural network will be briefly described below.

An executive subroutine of the back propagation will be described. Initial values of the neural weight ratios are established by random number. Then, calculation is repeated the number of times corresponding to the data to be learned. Output of each neuron is calculated and, further, the evaluation function is computed. Then, the correction amount of the neural weight ratio minimizing the value of the evaluation function is calculated. Then, the neural weight ratio is corrected according to the correction amount of the neural weight ratio, and the calculation is repeated. When, as a result, the sum of the values of the evaluation function is converged to a value less than a predetermined value, the final neural weight ratios are output.

Figures 2A, 2B, 2C:
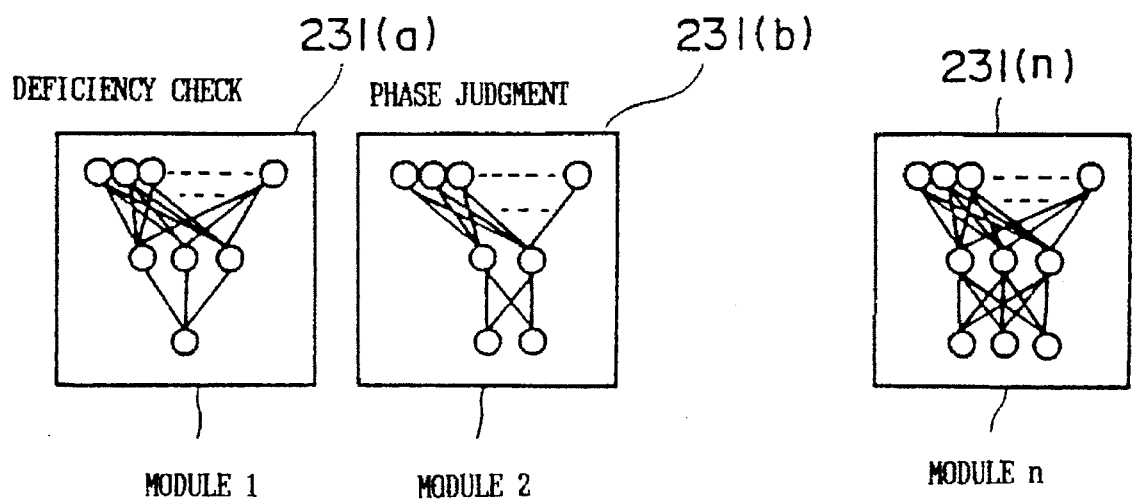
FIG. 2 is a diagram explanatory of neural network modules in the first embodiment.
Figure 3:
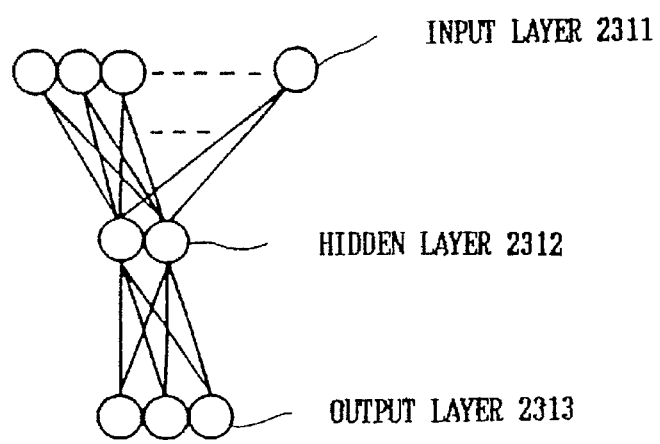
FIG. 3 is a diagram explanatory of a neural network module in the first embodiment.

Below will be given detailed description of the waveform identifying portion 23 of the present embodiment. The waveform identifying portion 23, as shown in FIG. 2, is structured of n pieces of relatively simple neural network modules $231(a)$, $231(b)$, . . . , $231(n)$. Each neural network module 231, as shown in FIG. 3, is formed of at least three layers of an input layer 2311, a hidden layer 2312, and an output layer 2313 and has neural weight ratios.

Figure 4:
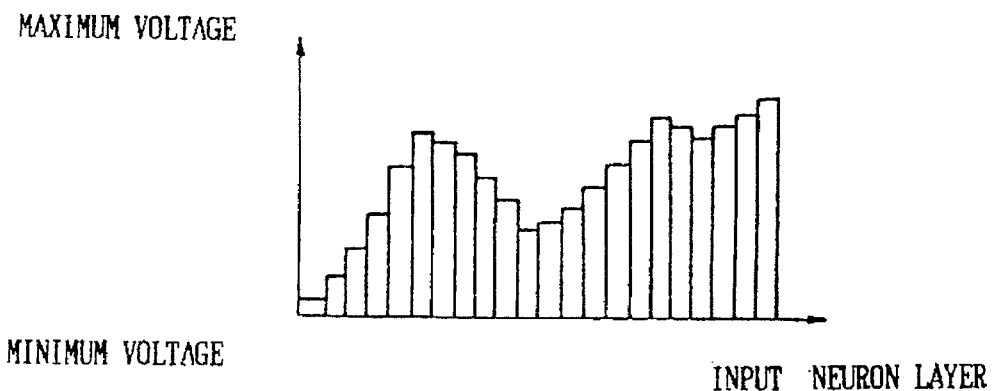
FIG. 4 is a diagram explanatory of input data to the neural network module in the first embodiment.

Input data to each of the neural network modules 231, 231, . . . is adapted such that each waveform data is sampled at intervals of a predetermined time for example as shown in FIG. 4, and each interval is assigned to one neuron. As the input value to each neuron, that of which the range of amplitude determined by the maximum voltage value and the minimum voltage value of the waveform is normalized to 1, for example, may be used. The number of input neurons is determined according to the shape of the waveform which the observer desires to observe. The waveforms input to each of the neural network modules 231, 231, . . . may be the same, or may not be the same, e.g., may be such waveforms that exhibit its characteristics well. Namely, the number of the input neurons may or may not be the same for each neuron. Further, as to the network structure of each of the modules, the number of neurons in the hidden layer and that in the output layer may or may not be the same.

The neural network modules 231, 231, . . . are individually established for each of the elements of characteristics to be identified. For example, they are established for each of the elements of characteristics to be specifically extracted such as phase, amplitude, and shape.

Teacher signals are formed by the teacher waveform determining portion 22. As to the teacher signals for each of the neural network modules 231, 231, for example representative waveforms considered best for each of the above described elements of characteristics are selected as first ideal waveform modules, while representative waveforms to be identified as unacceptable ones are established as second ideal waveform modules. The learning with the first ideal waveform module is made such that for example 1 is output from one output neuron, while the learning with the second ideal waveform module is made such that the output neuron responds with 0. As another method, one more output neuron responding with 1 or 0 may be prepared. The response is not limited to 1 or 0, but any other values can be used provided that they can be distinguished by a threshold value.

Figure 5:
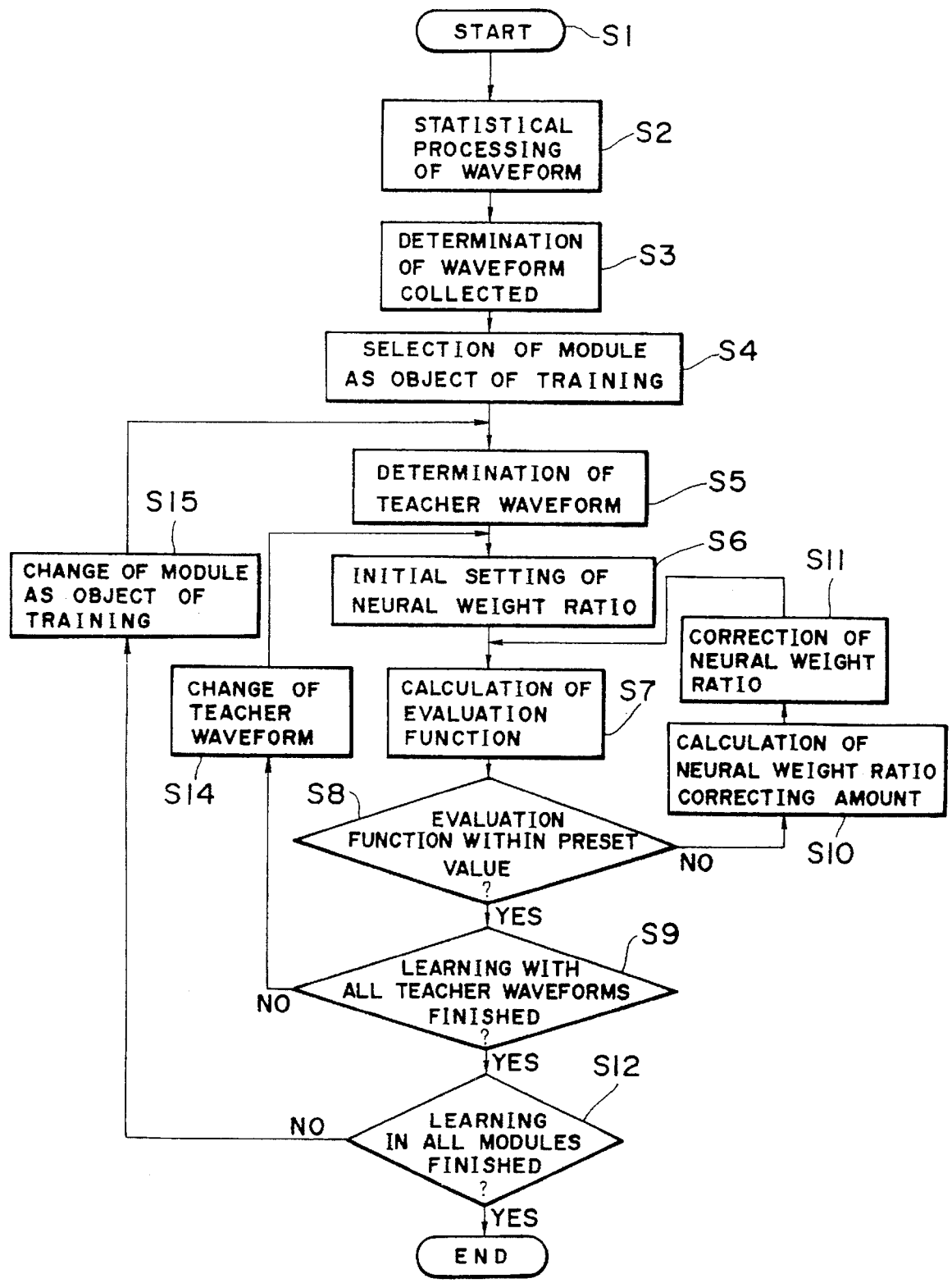
FIG. 5 is a flow chart explanatory of steps of learning procedure followed in the waveform evaluating apparatus 1 of the first embodiment.

Operation of the present embodiment will be described below. The waveform evaluating apparatus 1 of the present embodiment is adapted to make advance learning for waveform evaluation before executing the evaluation. The steps of learning procedure in the waveform evaluating apparatus 1 will be described with reference to FIG. 5.

First, in step 1 (hereinafter briefly referred to as S1, etc.) the learning is started and the control/computing portion 27 switches so that the input waveform is led to the training conducting system A. In the following S2, the waveform data to be collected from the object of measurement 10 is input to the waveform statistically processing portion 21 so that the waveform statistically processing portion 21 performs statistical processing of the waveform to generate an ideal waveform. In S3, the waveform statistically processing portion 21 determines the waveform which it collects, and performs the collection of the waveform.

Figure 6A:
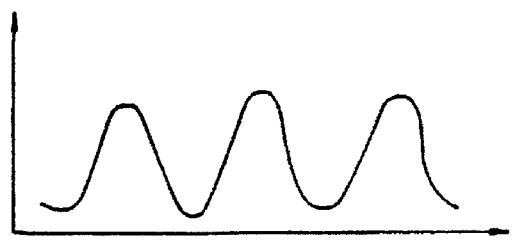
FIGS. 6(a), 6(b), 6(c), 6(d), 6(e), 6(f), 6(g), 6(h) and 6(i) are diagrams explanatory of a case where the waveform evaluating apparatus 1 of the first embodiment performs "deficiency detection"
Figure 6B:
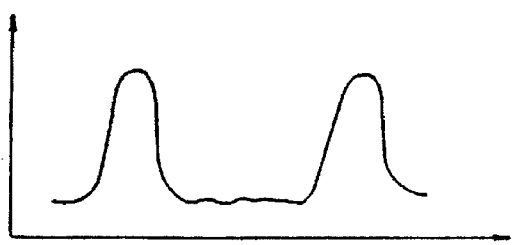
Figure 6C:
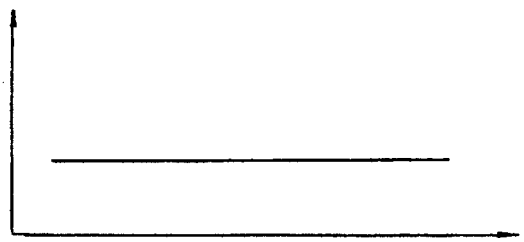

In S4, the neural network modules 231(a), 231(b) . . . as the objects of training are selected. In the case where the neural network module 231 selected here is the neural network module 231(a) for "deficiency detection" shown in FIG. 2, the waveform of FIG. 6(a) is determined as the first ideal waveform module, the waveform of FIG. 6(b) is determined as the primary second ideal waveform module, and the waveform of FIG. 6(c) is determined as the secondary second ideal waveform module in S5. As the first ideal waveform module of FIG. 6(a), the ideal waveform is adopted as it is.

Then, the learning is made with the determined teacher waveforms. First, in S6, the initial setting of the neural weight ratio is performed. Then, in S7, the evaluation function at the output layer is calculated in the state where the first ideal waveform module is input. In S8, it is decided whether or not the value of the evaluation function calculated in S7 is within a predetermined range. When it is within the predetermined range, S9 is followed, and therein it is decided whether or not learning with all of the teacher waveforms is finished. When the value of the evaluation function calculated in S7 is not within the predetermined range in S8, S10 is followed, and therein the correction amount of neural weight ratio is calculated. Then, in S11, the neural weight ratio is corrected according to the correction amount of neural weight ratio calculated in S10. Then, the evaluation function is calculated again in S7. This routine is repeated until the neural weight ratio is determined with which the value of the evaluation function converges to a value within a predetermined range.

When, it is decided in S9 that learning with all of the teacher waveforms in the selected neural network modules is finished, S12 is followed and, therein, it is decided whether or not learning is finished in all of the neural network modules 231(a), 231(b), . . . . When it is decided in S12 that learning in all of the neural network modules 231(a), 231(b), . . . are finished, S13 is followed and therein the learning is ended.

When, it is decided in S9 that the learning with all of the teacher waveforms in the selected neural network modules 231(a), 231(b), . . . is not yet finished, the flow of routine is moved to S14 and therein an unfinished teacher waveform is set up as the input signal and, then, the flow returns to S6 wherein learning is started again.

When it is decided in S12 that learning in all of the neural network modules 231(a), 231(b), . . . is not finished, the flow moves to S15, and therein the object of training is changed to the unfinished neural network module 231 and, then, the flow returns to S5, wherein learning with the teacher waveform corresponding to the changed neural network module 231 is conducted. In the event that the neural weight ratio cannot be determined or proper decision cannot be made because of unsuitability of the teacher signal, the teacher signal is changed and learning is made again.

The operation of the waveform evaluating apparatus 1 to perform waveform evaluation (judgment) with above described advance learning made will be described below.

Figure 7:
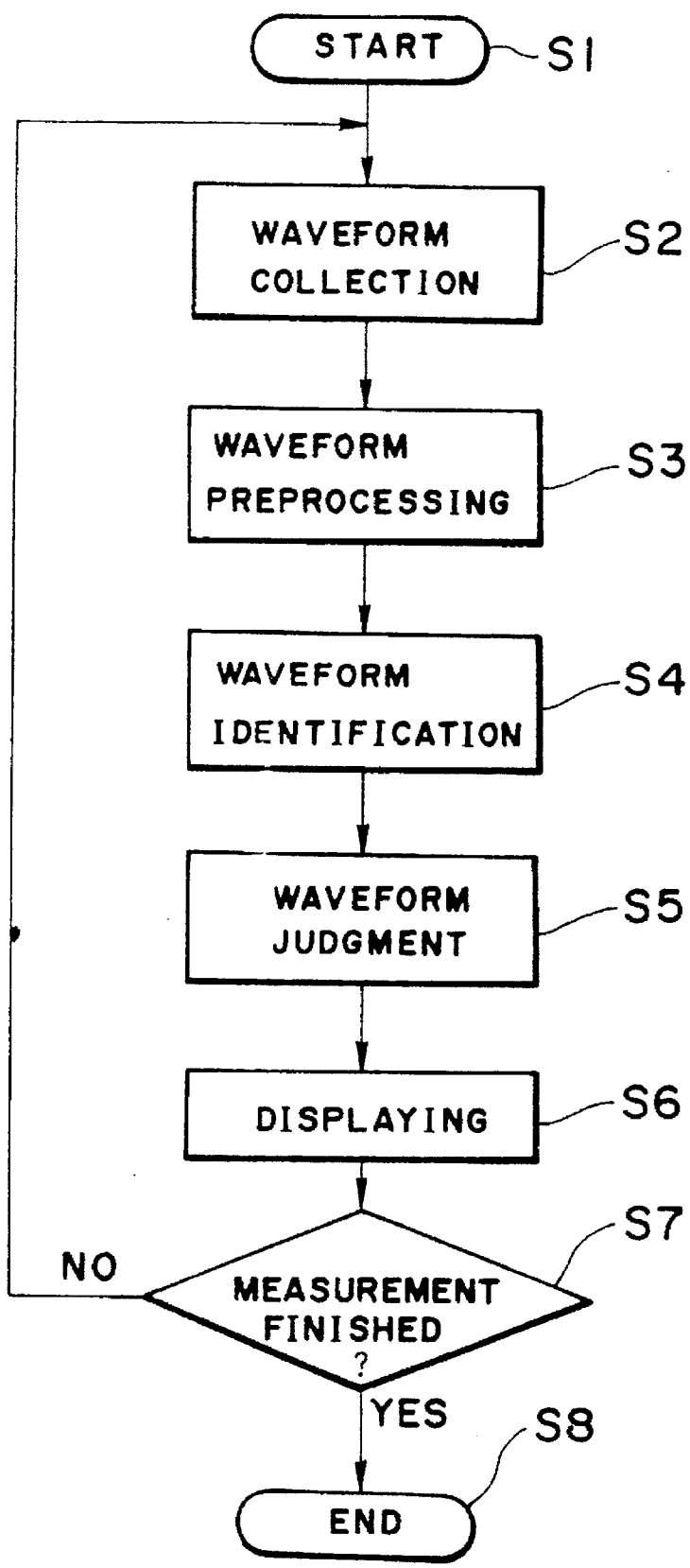
FIG. 7 is a flow chart explanatory of steps of waveform evaluating (judging) procedure followed in the waveform evaluating apparatus 1 of the first embodiment.

As shown in FIG. 7, the waveform evaluation is started at step 1 (hereinafter briefly referred to as S1, etc.) and the control/computing portion 27 switches such that the input waveform is led to the waveform evaluation system B. Then, in S2, the waveform collecting portion 25 performs waveform collection from the object of measurement 10. Then, in S3, the waveform preprocessing portion 26 performs waveform preprocessing such as waveform slicing, expansion, and contraction, on the waveform collected in S2. Then, in S4, the waveform identifying portion 23 performs waveform identification of the waveform preprocessed in S3. Then, in S5, the judging portion 24 performs the judgment of waveform on the waveform identified in S4. Further, in S6, the displaying portion 28 displays the result of judgment made in S5 in such a manner of display as Good or NoGood. In S7, it is decided whether or not the measurement has been finished and, when the measurement is finished, the flow proceeds to S8 and therein the measurement is ended. If the measurement is decided to be unfinished in S7, the flow is adapted to return to S2. It is possible to arrange such that the displaying portion 28 also displays data in the waveform statistically processing portion 21, teacher waveform determining portion 22, waveform collecting portion 25, and waveform preprocessing portion 26.

The case where the waveform evaluating apparatus 1 of the present embodiment evaluates a particular waveform will be described below.

First description on "deficiency detection" will be given. When an analog waveform as shown in FIG. 6(a) is established as a first ideal waveform module and it is desired to discriminate it from a waveform as shown in FIG. 6(b), a primary second ideal waveform module having the waveform shown in FIG. 6(b) as its representative waveform is established. Further, the DC data as shown in FIG. 6(c) may also be established as a secondary second ideal waveform module.

Making arrangement as described above, if teaching is conducted such that the response of one output neuron will become 1 to the waveform shown in FIG. 6(a) established as the first ideal waveform module and the response will become 0 to the waveform shown in FIG. 6(b) established as the primary second ideal waveform module, it is at least achieved that the response close to 1 is obtained when the waveform is similar to that shown in FIG. 6(a) and the response close to 0 is obtained when the waveform is similar to that shown in FIG. 6(b). Accordingly, by establishing a threshold value at a specific level, these waveforms can be easily discriminated from each other.

If attention is paid to the phase, since the neural network module 231 learned as described above is not restricted with respect to the phase, it can achieve the discrimination between waveforms even if the waveforms are of the shape as shown in FIG. 6(a) and FIG. 6(b) slightly shifted in phase.

Figure 6D:
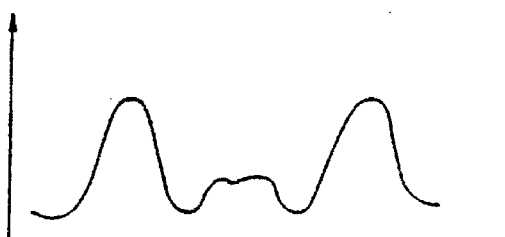

Further, since it has a high generalization capability, it can discriminate even such an undesirable waveform as shown in FIG. 6(d). If any of the output neurons is made to learn the secondary second ideal waveform module shown in FIG. 6(c), in addition to the first ideal waveform module shown in FIG. 6(a) and the primary second ideal waveform module shown in FIG. 6(b), discrimination can be equally attained and, further, the identification capability can be improved.

Figure 8A:
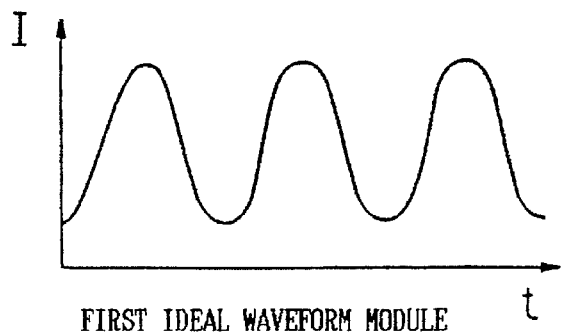
FIGS. 8(a), 8(b) and 8(c) are diagrams explanatory of a case where the waveform evaluating apparatus 1 of the first embodiment performs "phase detection"
Figure 8B:
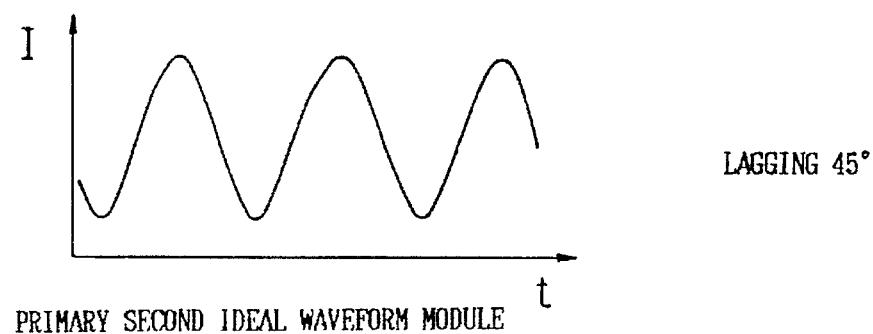
Figure 8C:
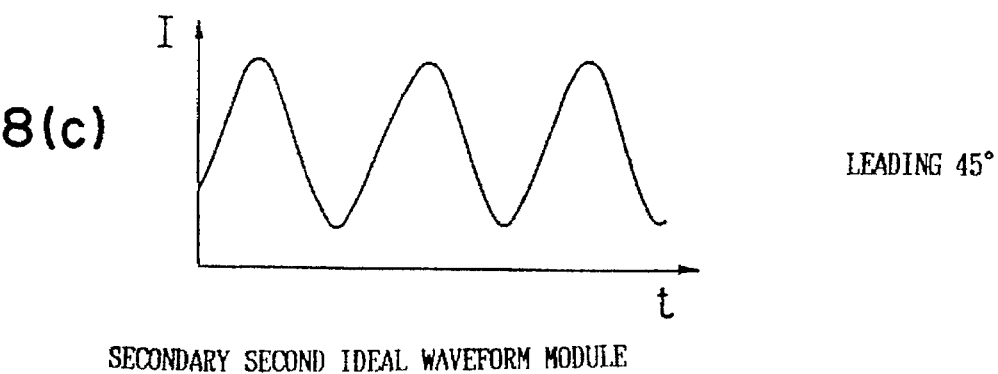

Now, the case of "phase-shift judgment" will be described. In the neural network module 231(b) for detecting a phase shift, by selecting the waveform in the representative phase as shown in FIG. 8(a) as the first ideal waveform module, the waveform with the phase lagged by 45° as shown in FIG. 8(b) as the primary second ideal waveform module, and the waveform with the phase led by 45° as shown in FIG. 8(c) as the secondary second ideal waveform module, the neural network module may be made to learn such waveforms. The primary second ideal waveform module and the secondary second ideal waveform module are typical examples in undesired phase. The neural network module detecting phase shift has nothing to do with the amplitude or shape of waveform but at least has a capability to discriminate between a waveform in a favorable phase and a waveform in an unfavorable phase.

When it is desired to make identification with respect to two elements of characteristics, such as that of the waveform of FIG. 6(b) and that of the waveform with a phase shift, at the same time, it will be achieved by causing the two neural network modules 231, i.e., the neural network module 231(a) and the neural network module 231(b), to make the identification. Accordingly, when it is desired to make identification with respect to a plurality of elements of characteristics, it will be achieved by establishing a plurality of neural network modules 231(a), 231(b), ... giving priority to the respective elements of characteristics.

As described above, only by assigning the representative first ideal waveform module and second ideal waveform modules for amplitude, shape, and place particularly desired to observe to the respective neural network modules so as to be learned thereby, the waveform desired to be identified can at least be identified.

Figure 6E:
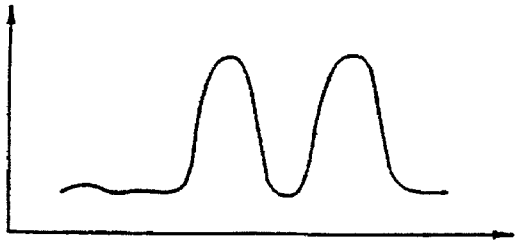
Figure 6F:
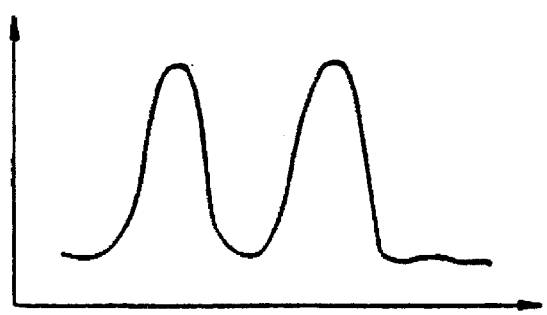

When the position to be observed has changed as shown in FIG. 6(e), a neural network module 231 for detecting the defective waveform of FIG. 6(e) may be established. Further, when a defective waveform as shown in FIG. 6(f) is desired to be detected, a neural network module 231 for detecting the defective waveform of FIG. 6(f) may be additionally provided. Instead of providing a plurality of neural network modules 231(a), 231(b), ..., it is also possible, as another example of learning, to provide one neural network module 231 with a capability of detecting the defects as shown in FIG. 6(b), FIG. 6(e), and FIG. 6(f). In such case, representative waveforms of FIG. 6(b), FIG. 6(e), and FIG. 6(f) may be used as second ideal waveform modules and the waveform of FIG. 6(a) may be used as the first ideal waveform module. Even if such an arrangement is adopted, since the second ideal waveform modules detect defects of their respective waveforms, it is attained to detect the elements of characteristics of defects shown in FIG. 6(b), FIG. 6(e), and FIG. 6(f).

Figure 6G:
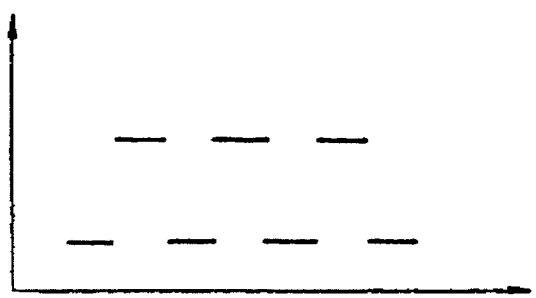
Figure 6H:
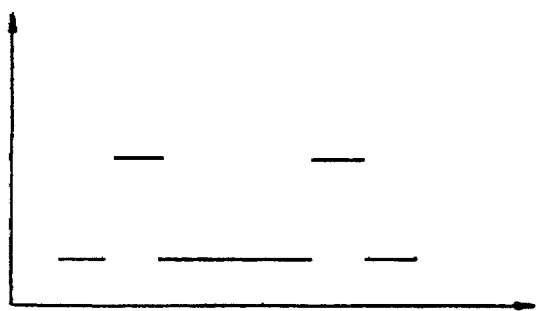
Figure 6I:
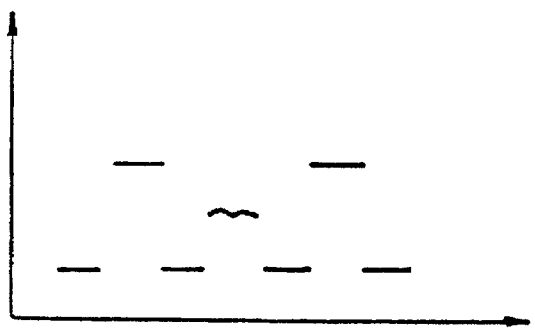

Although those shown in FIG. 6(a) to FIG. 6(d) were analog waveforms, similar identifying performance can be achieved even with rectangular waveforms as shown in FIG. 6(g) to FIG. 6(i). More specifically, by establishing representative ones as shown in FIG. 6(g) and FIG. 6(h) as the first ideal waveform module and the second ideal waveform module, respectively, it becomes possible to detect undesirable waveforms shown in FIG. 6(h) and FIG. 6(i). Thus, by assigning one to several elements of characteristics to be detected to each of the neural network modules 231, 231, ..., their generalization capabilities are improved and the neural network modules 231 at least capable of detecting the elements of characteristic to be identified can be realized.

In the waveform evaluating apparatus 1 of the present embodiment arranged as above, it is adapted such that the judging portion 24 forms a judgment of Good/NoGood about the quality of a waveform on the basis of a plurality of identification results output from the neural network modules 231(a), 231(b), ... of the waveform identifying portion 23. However, when it is apparent that the waveform to be judged is defective without checking the output results from the neural network modules 231(a), 231(b), ..., it makes a judgment of NoGood. For example, when the amplitude of an input waveform is extremely great or extremely small, a NoGood judgment is made before the results obtained by the waveform identifying portion 23 are confirmed.

When the judging portion 24 forms a judgment according to the output results from the plurality of neural network modules 231(a), 231(b), ..., it is adapted such that a waveform is judged Good when all first ideal waveform module identifying neurons of the neural network modules 231(a), 231(b), ... are responding with values larger than the established threshold value, while the waveform is judged NoGood if any one is not responding so.

When the element of characteristics to be identified has increased, a neural network module 231 for identifying that element of characteristics may be added and made to learn it and, hence, there is no need of causing other neural network modules 231 which have already made learning to make learning anew. Further, in making the judgment, the judging portion 24 is only required to add the output result of the neuron for identifying the first ideal waveform module of the added neural network module to its judgment which has been made as to the quality of the waveform. By so arranging, the learning in each of the neural network modules 231(a), 231(b), ... can be performed at high speeds, falling in local minima can be avoided, and the number of neurons can be kept smaller, and thus such a merit is obtained that the apparatus can operate well with lower memory capacity. Such a merit can also be obtained that additional learning is easily attained because it is realized only by increasing relevant neural network modules 231.

[First Variation of the First Embodiment]

Figure 9:
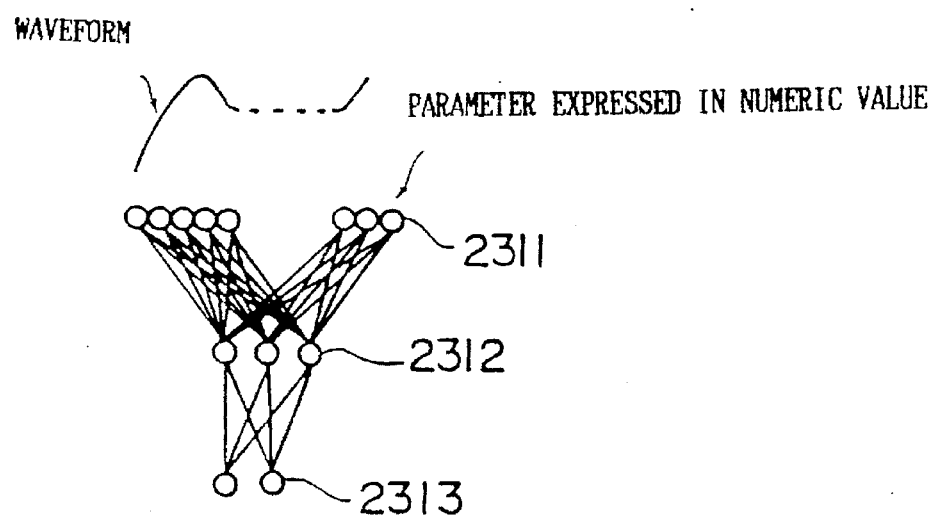
FIG. 9 is a diagram explanatory of a first variation of the first embodiment.

Now a first variation of the first embodiment will be described. The first variation, as shown in FIG. 9, is arranged such that parameters such as evaluation value related to the elements of characteristics to be identified, other than waveform data, are added to the input neurons of the neural network modules 231(a), 231(b), ... of the waveform identifying portion 23. By adding them such parameters as the root-mean-square value, average value, maximum value, minimum value, frequency of the waveform and some other evaluation value (which may be the output value of the neural network module 231) normalized to 1 in analogue value, the identifying capabilities of the neural network modules 231(a), 231(b), ... can be improved.

[Second Variation of the First Embodiment]

Figure 10:
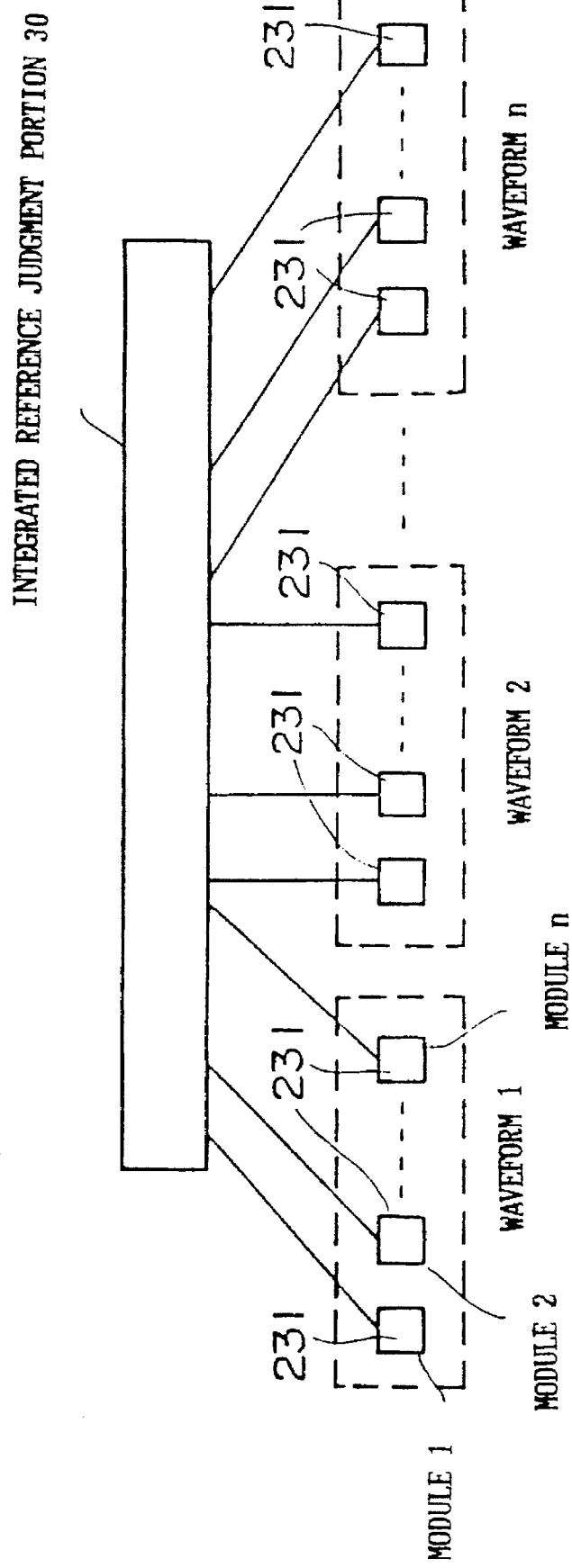
FIG. 10 is a diagram explanatory of a second variation of the first embodiment.

A second variation of the first embodiment of the present invention will be described with reference to FIG. 10. The second variation is such that is provided additionally with an integrated reference judgment portion 30 for performing judgment by reference and the integrated reference judgment portion 30 has plural sets of neural network modules 231(a), 231(b), ... connected in parallel. More specifically, there are plural sets of neural network modules 231(a), 231(b), ... independently provided for waveform data of each position of the object of measurement 10 (waveform 1, waveform 2, ..., waveform n) and output results from all of them are connected to the integrated reference judgment portion 30. In the second variation, defective positions, overall performance, etc. of the object of measurement 10 can be judged by reference to results of identification, measurement values of the waveform, and the like obtained by the neural network modules 231(a), 231(b), ... for each position as shown in FIG. 11. The integrated reference judgment portion 30 is made up of logical processes, other neural networks, fuzzy reference processes, and the like. By providing such additional function, a high level and intelligent waveform evaluating apparatus 1 can be provided.

The first embodiment arranged as described above is structured of at least three layers of the input layer, hidden layer, and output layer. A signal as the object of judgment is input to the input layer of the neural network module having a neural weight ratio, while a plurality of such neural network modules are provided independently for each of the objects of judgment. The neural weight ratio of each neural network module is adapted to be determined by causing the same to learn with a first ideal waveform module being an ideal signal and a second ideal waveform module corresponding to an element of characteristics as the object of judgment. Therefore, such a merit can be obtained that waveform evaluation can be attained without the need for making complicate programs or the like for each waveform and only having simple learning made. More specifically, since a plurality of neural network modules are set up for each of the elements of characteristics and a first ideal waveform module and second ideal waveform modules are established for each of elements of characteristics desired to be extracted, such a merit is obtained that all kinds of waveforms can be evaluated only by having simple learning made. Especially, since it is arranged such that an input waveform is divided into elements of characteristics as the objects of judgment of good or bad quality, or such elements are extracted from the input waveform, a first ideal waveform module and second ideal waveform modules are established according to the elements of characteristics, and the neural network module is made to learn, and, thereafter, the judgment is made, a great effect is obtained that an excellent judgment can be formed.

Such a good effect can also be obtained that, even when elements of characteristics to be identified are increased, it is only required to add neural network modules corresponding to the new elements of characteristics to the originally established neural network modules, without the need for changing the same. The present invention further has a merit that it can provide a waveform evaluating apparatus which is applicable to general purposes, free from personal error in the judgment, and facilitating mechanization and automation.

[Second Embodiment]

The above described first embodiment could also identify a shift in phase by including phasic information in the waveform to be learned. However, when the input signal includes a shift in phase extending over a wide range or an aperiodic waveform, there arises a problem that the neural network modules makes erroneous recognition so that the rate of judgment becomes lower. The second embodiment has been developed to solve this problem. Namely, it is a waveform evaluating apparatus 1 provided with neural network modules, each of which has a neural weight ratio determined through learning the first ideal waveform module as the ideal signal, and it is therein adapted such that a signal in phase with the learned teacher signal is extracted from the signal as the object of judgment and the extracted signal is input to the input layer, so that erroneous recognition can be decreased and the rate of judgment can be improved.

Figure 12:
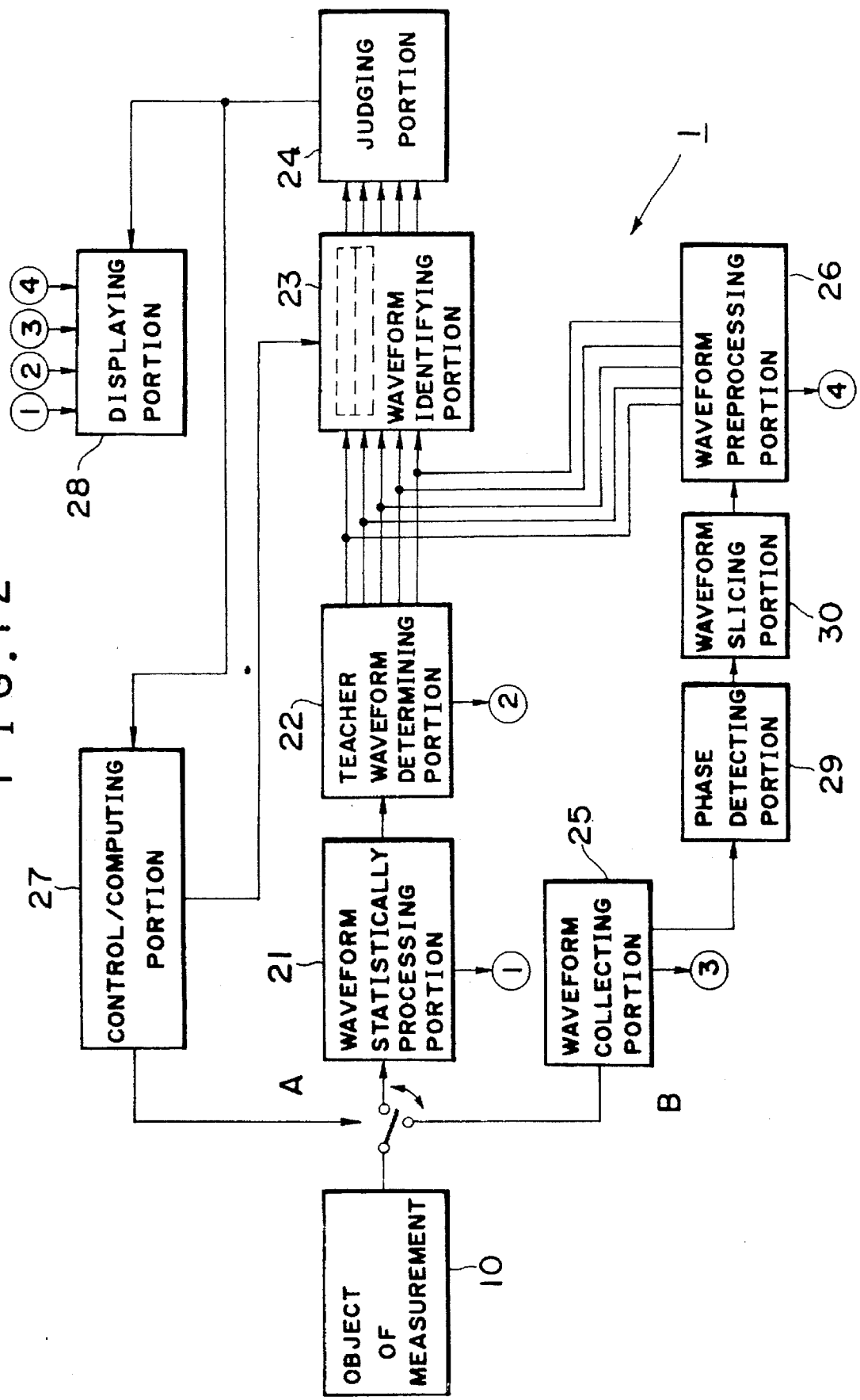
FIG. 12 is a diagram showing structure of a second embodiment of the present invention.

The waveform evaluating apparatus 1 of the second embodiment shown in FIG. 12 is composed of a training conducting system A and a waveform evaluating system B. The training conducting system A is the system, like that in the first embodiment, in which a signal from the object of judgment 10 is led, through the waveform statistically processing portion 21, teacher waveform determining portion 22, waveform identifying portion 23, to the judging portion 24, while the waveform evaluating system B of the second embodiment is a system in which the signal from the object of judgment 10 is led, through the waveform collecting portion 25, a phase detecting portion 29, a waveform slicing portion 30, the waveform preprocessing portion 26, and the waveform identifying portion 23, to the judging portion 24.

The phase detecting portion 29 is that for detecting the phase of the waveform collected by the waveform collecting portion 25 and has the purpose to bring the phase of the waveform to be identified in phase with that of the learned waveform. The phase detection can be achieved by later described correlation processing or through a neural network. The waveform slicing portion 30 is that for slicing the waveform according to the phase amount detected by the phase detecting portion 29. The phase detecting portion 29 and the waveform slicing portion 30 constitute a signal extracting portion.

Figure 13:
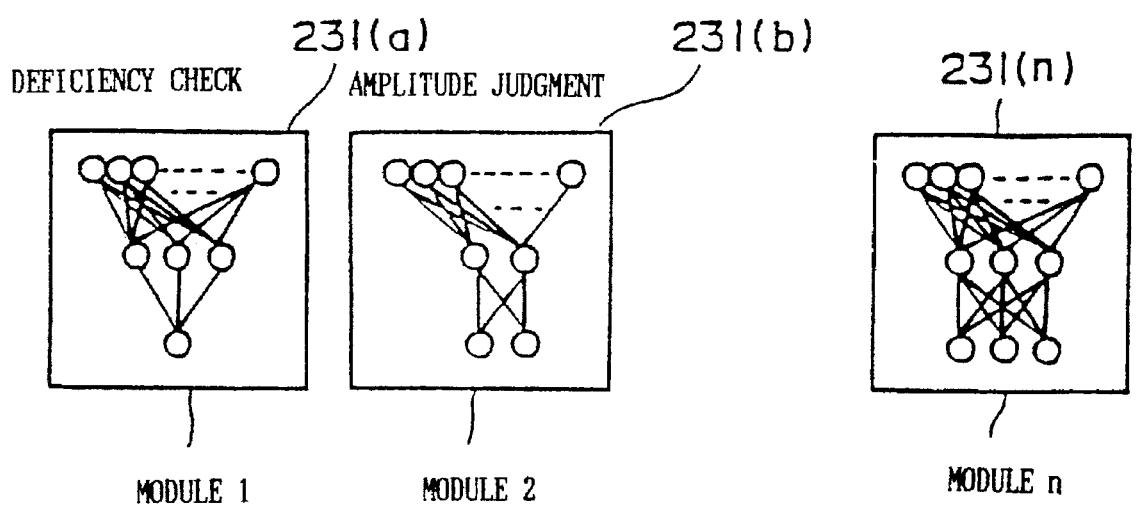
FIG. 13 is a diagram explanatory of neural network modules in the second embodiment.

The waveform identifying portion 23 in the second embodiment is arranged as shown in FIG. 13.

Other arrangement than the above is the same as that in the first embodiment and, hence, description of the same will be omitted.

Below will be given detailed description of the principle of the phase detection performed by the phase detecting portion 29 in the second embodiment.

[Phase Detecting Method by Correlation Processing]

Figure 14A:
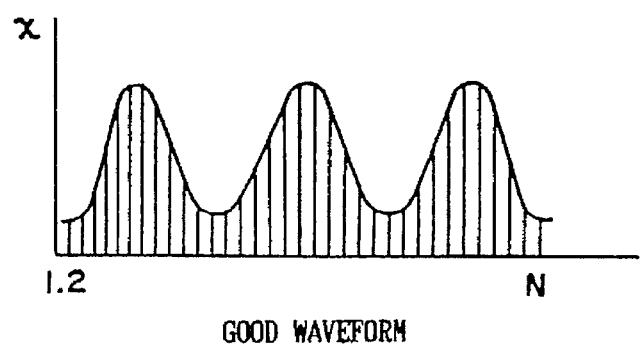
FIGS. 14(a), 14(b), 14(c) and 14(d) are diagrams explanatory of the principle of phase detection performed by a phase detecting portion 29 in the second embodiment.
Figure 14B:
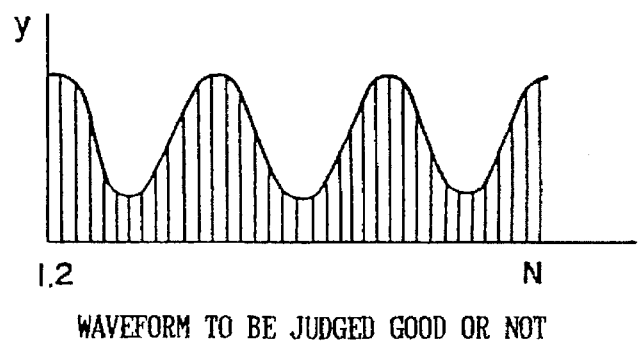

The first phase detecting method is that makes use of correlation processing. First, the correlation coefficient is calculated with the first ideal waveform module signal used as template. For example, a good waveform shown in FIG. 14(a) is used as the template. When the number of sampling points of the waveform is denoted by N, the voltage values at the sampling points are denoted by $X_1$ to $X_N$, and the waveform whose quality is to be determined good or not is that shown in FIG. 14(b), and if the voltage values corresponding to the sampling points are denoted by $y_1$ to $y_N$, then the correlation coefficient r of the waveform of FIG. 14(b) to that of FIG. 14(a) is calculated by $$r = (1/(N*Sx*Sy)) \sum_{i=1}^{N} ((xi - \bar{x}) * (yi - \bar{y})) \quad (1)$$

where $$\bar{x} = (1/N) \sum_{i=1}^{N} xi \quad (2)$$

$$\bar{y} = (1/N) \sum_{i=1}^{N} yi \quad (3)$$

$$Sx^2 = (1/N) \sum_{i=1}^{N} (xi - \bar{x})^2 \quad (4)$$

$$Sy^2 = (1/N) \sum_{i=1}^{N} (yi - \bar{y})^2 \quad (5)$$

Figure 14C:
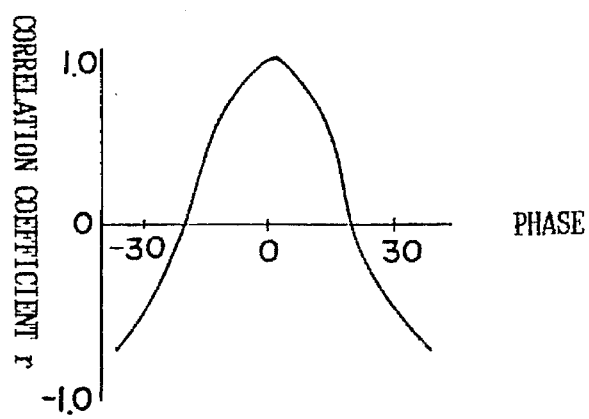

When the phase of the good waveform of FIG. 14(a) is set to 0°, the correlation coefficient obtained for the waveform out of phase by ±5° to ±40° becomes as shown in FIG. 14(c). As apparent from FIG. 14(c), the correlation coefficient at the phase 0° becomes closest to 1 or equal to 1.

Figure 14D:
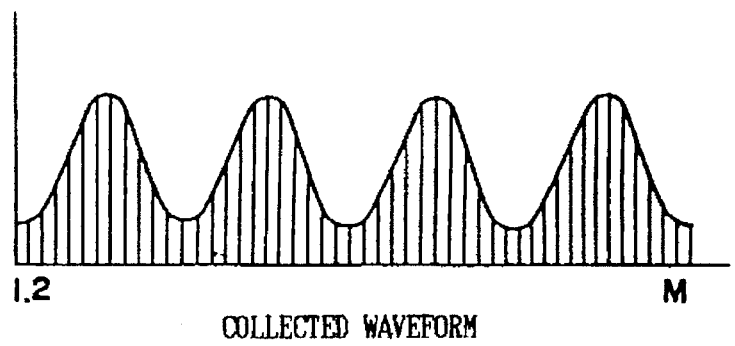

In the evaluation of a waveform, the waveform evaluating apparatus 1 of the second embodiment is arranged to pick up the waveform by sampling M (M>N) points greater than the waveform which is actually used for judgment and a correlation coefficient r is calculated from the waveform formed of the sampling points 1 to N of FIG. 14(d) referenced to the waveform as the template shown in FIG. 14(a).

Then, a correlation coefficient r is calculated from the waveform formed of the sampling points 2 to N+1, ..., and finally a correlation coefficient r is calculated from the waveform formed of the sampling points M–N to M. By plotting the correlation coefficients r, FIG. 14(c) is obtained and the waveform position at the phase 0° can be determined.

Then, on the basis of the position information at the phase 0°, a waveform is sliced by the waveform slicing portion 30 and the waveform is output to the waveform identifying portion 23.

The shape of the waveform may be different from that of the waveform shown in FIG. 14. Then, the correlation coefficient r may differ from that shown in FIG. 14(c) but the waveform position at the phase 0° can be determined by detecting the peak of the correlation coefficient r. Incidentally, the method for calculating the correlation coefficient r is not limited to that using equation (1), but it can be calculated by any other method such as uses cross-correlation function. The waveform position at the phase 0° can be obtained by determining the peak of the correlation coefficient r, correlative function, or the like.

Since the correlation coefficient r in equation (1) is a normalized correlation coefficient, similarity can also be judged by computing this equation and, hence, a bad waveform can be detected by judging the similarity using the correlation coefficient r at the peak. Further, instead of calculating the correlation coefficient r by shifting the sampling points as described above, such an arrangement can be made in which waveform identifying portions which have made learning for each of phases are provided and a waveform identifying portion is selected therefrom according to the correlation coefficient r, and the waveform is directly input thereto, without performing waveform slicing,. In this case, however, it becomes necessary to provide waveform identifying portions for each of phases to be judged and a corresponding memory must be secured for performing related computation.

[Method (A) for Phase Detection by Neural Network]

Figure 15:
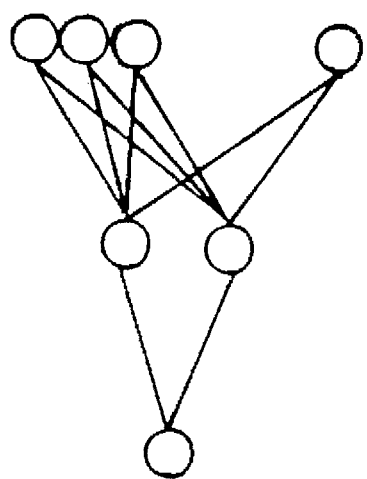
FIG. 15 is a diagram explanatory of a neural network module in the second embodiment.

A method for phase detection using a neural network as a second method will be described below. Phase detection can be achieved by using a neural network as shown in FIG. 15. More specifically, the number of units forming the hidden layer 152 can be of an arbitrary number and the number of output layer is one. Data learned in the neural network are set such that the teacher signal for the waveform at the phase 0° is set to 0.5, the teacher signal for the waveform at the phase −10° is set to 0.4, the teacher signal for the waveform at the phase −20° is set to 0.3, the teacher signal for the waveform at the phase −30° is set to 0.2, ..., the teacher signal for the waveform at the phase +10° is set to 0.6, the teacher signal for the waveform at the phase +20° is set to 0.7, the teacher signal for the waveform at the phase +30° is set to 0.8, and so on.

Setting up the teacher signals as above and causing the neural network to learn them, the neural network finished with the learning, when a waveform to be identified is input thereto via input layer 151, outputs a value close to (or equal to) the teacher signal set up according to the shift in the phase. By making the number of sampling points of the collected waveform greater than the waveform to be identified as shown in FIG. 14(d), it is achieved to have the waveform sliced by the waveform slicing portion 30 at the position of the phase 0°.

Incidentally, the teacher signal at the phase 0° is not limited to 0.5 but other value can be used therefor. Further, the number of unit of the output layer 153 is not limited to one.

The method for phase detection using a neural network as the second method has such a merit that a lag or lead in phase can also be judged.

[Method (B) for Phase Detection by Neural Network]

Another method for detecting the phase shift amount using a neural network as a third method will be described below. As with the second method, description will be made taking the neural network of FIG. 15 as an example. The data to be learned by the neural network are set, differing from those in the second embodiment, such that the teacher signal for the waveform at the phase 0° is set to 0.9, and the teacher signal for the waveform at the phase ±10° is set to 0.1. More specifically, the waveform at the phase 0° and the waveform at the phase ±10° are specified as the waveforms for the teacher signals. When learning has been made with such learning data, the neural network responds with 0.1 when the phase of the waveform to be identified is greater than +10° or smaller than −10°, and it responds with 0.9 or thereabout when the waveform to be identified is between +10° and −10°.

As with the fist method, the waveform formed of sampling points 1 to N of the collected waveform as shown in FIG. 14(d) is input to the neural network so that the output values are computed thereby. Then, the waveform formed of sampling points 2 to N+1 of the collected waveform is input to the neural network so that the output values are computed thereby, ..., and finally the waveform formed of sampling points M–N to M is input to the neural network so that the output values are computed thereby. By searching the output values of the neural network for the peak value, the waveform position at the phase 0° can be obtained. The waveform slicing can be performed in the waveform slicing portion 30 according to the waveform position at the phase 0°.

As another method, the phase shift amount of a waveform may be detected by preparing neural networks of the same number as that of the phases of the waveform to be judged. More specifically, in addition to the above neural network, a neural network learned with the teacher signal set to 0.9 for the phase shift 20°, learned with the teacher signal set to 0.1 for the phase shift 10°, and learned with the teacher signal set to 0.1 for the phase shift 30°, a neural network learned with the teacher signal set to 0.9 for the phase shift 30°, learned with the teacher signal set to 0.1 for the phase shift 20°, and learned with the teacher signal set to 0.1 for the phase shift 40°, ... are provided and the waveform is input to each of the neural networks. Then, by selecting the neural network which outputs the highest response, the phase shift can be detected. On the basis of the detected phase shift, the waveform slicing can be performed.

Such a method can also be employed in which the waveform identifying portions are provided for each of the phase shift amounts (0°, ±10°, ±20°, ... ). The number of the output unit of FIG. 15 is not limited to one, and the number of the hidden units can be determined suitably.

Operation of the second embodiment will be described below. The waveform evaluating apparatus 1 of the second embodiment is adapted to make the advance learning for performing the evaluation prior to the execution of the waveform evaluation. Since the steps of learning procedure in the waveform evaluating apparatus 1 of the second embodiment are the same as those in the first embodiment shown in FIG. 5, description of the same will be omitted here.

Operation of the waveform evaluating apparatus 1 of the second embodiment executing the waveform evaluation (judgment) making such advance learning will be described below.

Figure 16:
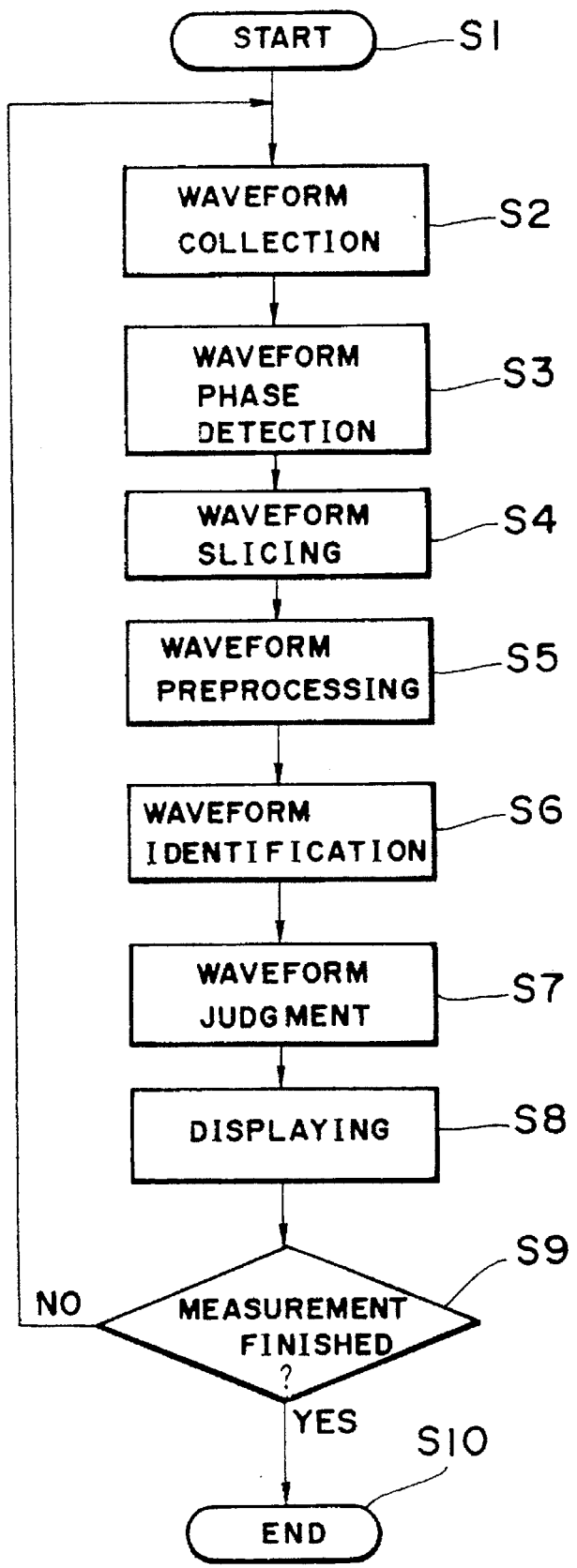
FIG. 16 is a flow chart explanatory of the steps of waveform evaluating (judging) procedure followed in the waveform evaluating apparatus 1 of the second embodiment.

As shown in FIG. 16, the waveform evaluation (judgment) is started at step 1 (hereinafter briefly referred to as S1, etc.) and the control/computing portion 27 makes the switching such that the input waveform is led to the waveform evaluating system B. Then, in S2, the waveform collecting portion 25 performs the waveform collection from the object of measurement 10. Then, in S3, the waveform collected in S2 is subjected to the phase detection in the phase detecting portion 29. In the present embodiment, the phase detection is performed by computing the correlative coefficient r. Further, in S4, the waveform slicing position is determined according to the phasic information detected in S3 and the waveform is sliced by the waveform slicing portion 30. As a result, the waveform in which the phase shift is compensated for can be sliced.

In S5, the waveform sliced in S4 is subjected to waveform preprocessing such as expansion and contraction in the waveform preprocessing portion 26.

In S6, the preprocessed waveform in S5 is subjected to the waveform identification in the waveform identifying portion 23, and in S7, the identified waveform is subjected to the judgment in the judging portion 24. Further in S8, the result of judgment made in S7 is displayed by the displaying portion 28 in a manner of display such as Good/NoGood. In S9, it is decided whether the measurement has been finished or not, and when the measurement is finished, the measurement is ended in the following S10. When it is decided that the measurement is not yet finished in S9, the flow of routine is adapted to return to S2. It is also possible to cause the displaying portion 28 to display data in the waveform statistically processing portion 21, teacher waveform determining portion 22, waveform collecting portion 25, waveform preprocessing portion 26, phase detecting portion 29, and waveform slicing portion 30.

Since the operation of the waveform evaluating apparatus 1 of the second embodiment performed for evaluating a particular waveform is the same as that described in FIG. 6 for the first embodiment, description of the same will be omitted here.

Further, since other arrangement than described above is the same as that in the first embodiment, description of the same will be omitted. Incidentally, the first variation and the second variation of the first embodiment are also applicable to the second embodiment. In the case where the second variation is applied to the second embodiment, results of identification, measurement values of the waveform, and the like of the neural network modules 231($a$), 231($b$), ... for each position of FIG. 11 become as shown in FIG. 17.

In the second embodiment structured as described above, it is arranged such that at least three layers, the input layer to which the signal as the object of judgment is input, the hidden layer, and the output layer, are given neural weight ratios and connected so as to form a network. The neural weight ratios of the neural network module are determined after learning has been made with the first ideal waveform module being an ideal signal and the signal extracting portion inputs an extracted signal from the signal as the object of judgment in phase with the learned teacher signal. Since the signal extracting portion is disposed in the stage preceding the input layer, such an excellent merit can be obtained that erroneous recognition made by the neural network module is greatly reduced and the rate of judgment is greatly improved.

The signal extracting portion of the second embodiment has the phase detecting portion detecting phasic information and the waveform slicing portion slicing the waveform according to the phasic information detected in the phase detecting portion. Further, since the phase detecting portion of the present invention is able to detect phasic information by correlative processing or through a neural network which has made predetermined learning, such a merit can be obtained that phase detection can be achieved with high precision by the correlative processing or through the neural network. Further, such an excellent merit is obtained that, when the correlative processing is made, judgment of the similarity can be achieved at the same time.

The second embodiment further provides such an excellent merit that the rate of judgment can be improved and asynchronous waveform which is otherwise unable to be synchronized can be handled.

[Third Embodiment]

A waveform evaluating apparatus 1 of a third embodiment capable of adjusting the output waveform will now be described.

Figure 18:
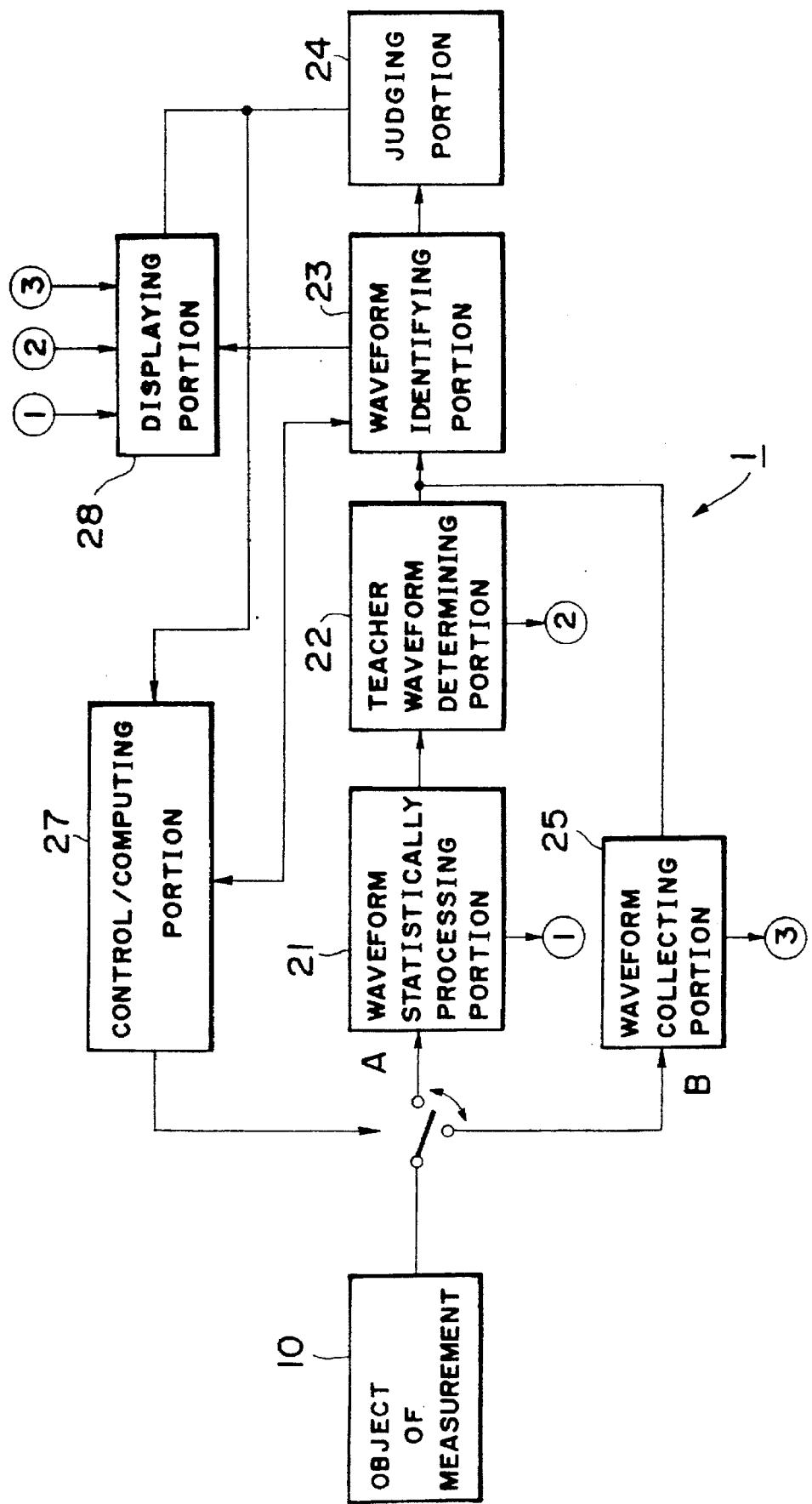
FIG. 18 is a diagram showing structure of a third embodiment.

The waveform evaluating apparatus 1 of the third embodiment, as shown in FIG. 18, is composed of a training conducting system A and a waveform evaluating system B. The training conducting system A is a system in which a signal from the object of judgment 10 is led, through the waveform statistically processing portion 21, teacher waveform determining portion 22, and waveform identifying portion 23, to the judging portion 24. The waveform evaluating system B is a system in which the signal from the object of judgment 10 is led, through the waveform collecting portion 25 and waveform identifying portion 23, to the judging portion 24. The object of judgment 10 is an apparatus as the object of measurement outputting a signal the waveform of which is to be evaluated, and this apparatus is capable of varying the amplitude, phase, etc. of the waveform so that the output waveform is adjusted by the waveform evaluating apparatus 1 of the third embodiment.

The judging portion 24 is that makes a judgment according to the results of identification in the waveform identifying portion 23 and it is adapted to deliver the results of judgment to the control/computing portion 27 and the displaying portion 28.

The waveform collecting portion 25 is that for collecting a waveform from the object of measurement 10.

Since the waveform statistically processing portion 21, teacher waveform determining portion 22, waveform identifying portion 23, and the control/computing portion 27 are similar to those in the first embodiment, description of the same will be omitted here.

Figure 19:
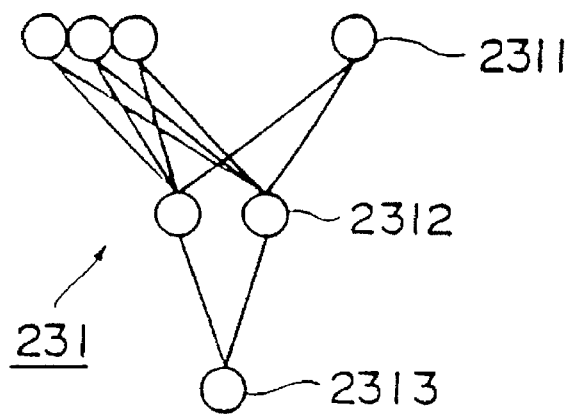
FIG. 19 is a diagram explanatory of a neural network in the third embodiment.

Now, the waveform identifying portion 23 of the third embodiment will be described in detail. The waveform identifying portion 23, as shown in FIG. 19, is constituted of a neural network 231. The neural network 231 is formed of, at east, three layers of an input layer 2311, a hidden layer 2312, and an output layer 2313, and has neural weight ratios. In the third embodiment, the adjustment and evaluation of a waveform is executed by causing the neural network 231 to learn and by inputting the waveform to the neural network 231 which has made the learning.

The input data to the neural network 231 is provided for example by sampling the waveform data at intervals of a predetermined period of time as shown in FIG. 4 for the first embodiment and assigning each interval to one neuron. Basically, the data is the same as the input data to the neural network 231 of the first embodiment, but the number of neurons of the hidden layer 2312 are suitably adjusted according to the learning to be made. The output neuron is set to one in number and adapted to be used for adjustment of the output analog value.

Figure 20:
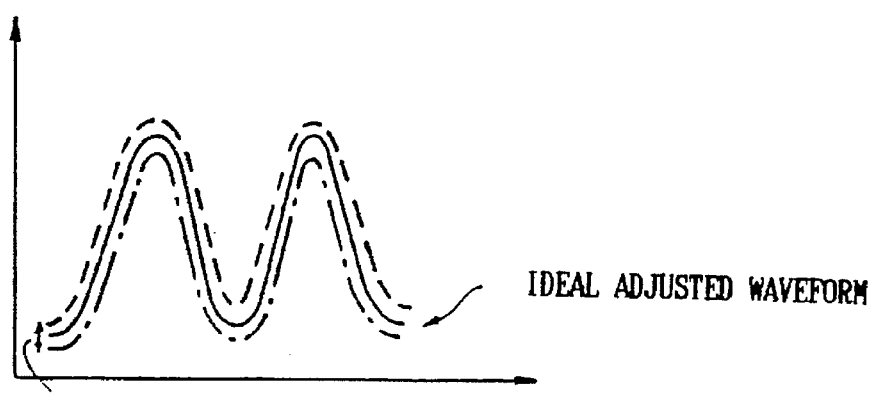
FIG. 20 is a diagram showing the adjustable range of waveform in the third embodiment.
Figure 21:
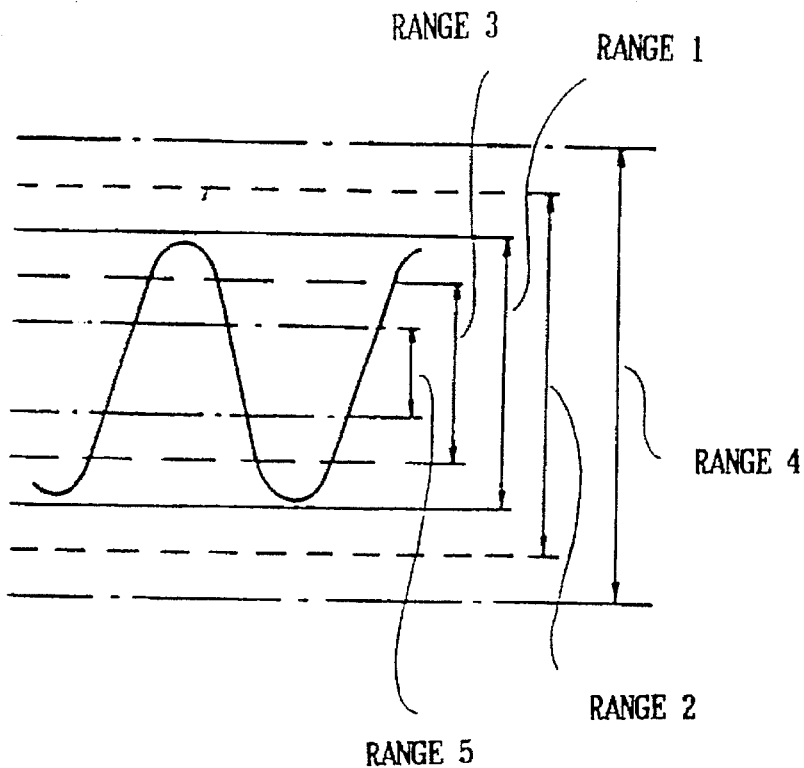
FIG. 21 is a diagram showing ranges for waveform adjustment in the third embodiment.

Now, the operation of the teacher waveform determining portion 22 will be described in detail. Supposing that there is a waveform adjustment range for example as shown in FIG. 20, the case where a waveform is adjusted within the waveform adjustment range by changing the magnitude of the waveform through adjustments of the volume etc. of the object of judgment 10 will be described. FIG. 21 is a diagram showing waveform adjustment regions. Since the ideal waveform is a waveform whose amplitude is within the range 1, the adjustment may be made by driving the waveform into the region between the range 2 and the range 3.

As the waveforms to be learned in this case, the waveform having the amplitude within the range 1 is first established as the first teacher waveform being the ideal waveform. The first teacher waveform as the ideal waveform is set for example to 0.5. Then, as the second teacher waveform, the waveform with the amplitude within the range 3 is set to 0.4, and further as the third teacher waveform, the waveform with the amplitude within the range 2 is set to 0.6, and thus the data to be learned are set such that the ideal waveform is sandwiched therebetween. Although the adjustment can be achieved only by making the above described arrangement, by further arranging such that the waveform within the range 4 is set to 0.7, the waveform within the range 5 is set to 0.3, and so on, such that the ideal waveform is put between multiple sets of teacher waveforms, conditions for adjustments of the waveform can be expressed more finely and quantitatively. Further, by setting the above teacher waveforms to those free from noise, the precision can be improved.

Figure 25:
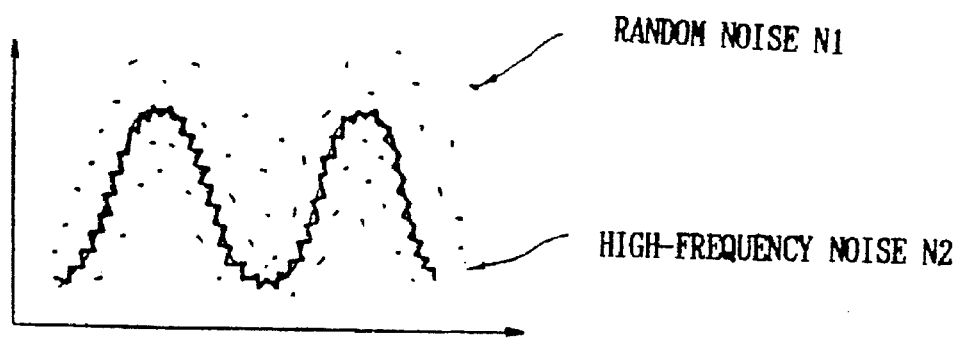
FIG. 25 is a diagram explanatory of a state where a signal waveform includes noises.

After teacher signals as described above have been established and the learning with them has been finished, a waveform from the object of judgment 10 is input to the neural network 231 which has finished with the learning. Then, even when the waveform includes noises, if the waveform is within any of the established ranges, an analog value close to it will be output. For example, even when the ideal waveform is including random noises N1 or high-frequency noises N2 as shown in FIG. 25, it can be satisfactorily processed.

By causing the neural network 231 to make the learning as described above, the neural network 231 comes to have waveform interpolating function. When, as with the present embodiment, the a waveform coming between 0.4 and 0.6 is taken as acceptable, the waveform may be adjusted to 0.5. If it is desired to make a finer adjustment, the ranges may be set more finely. Although the range 1 was set to 0.5, the range 3 to 0.4, the range 2 to 0.6, the range 4 to 0.7, the range 5 to 0.3, and so on, the set values are not limited to them but they may be changed only they are sequential in order of sandwiching. Further, by establishing the teacher signals such that the waveform whose amplitude is within the range 1 is set to 1.0, the waveforms whose amplitudes are within the range 2 and the range 3 are set to 0.9, and the waveforms whose amplitudes are within the range 4 and the range 5 are set to 0.8, and by causing the neural network to learn the same, it may be arranged, for example by setting the range of adjustment to be from 0.9 to 1.0, to take the evaluation and adjustment is better the closer to 1.0 it is.

Figure 22:
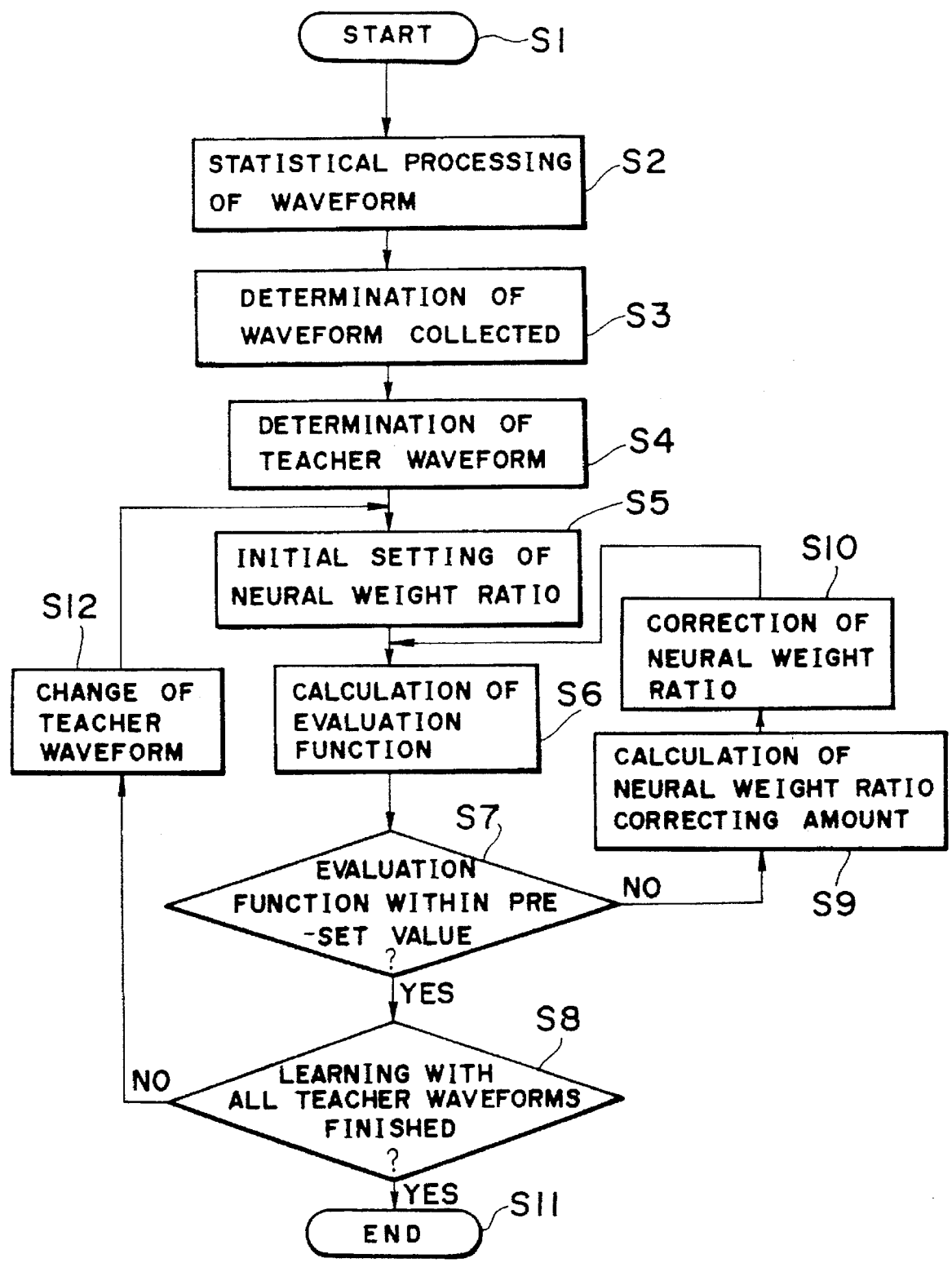
FIG. 22 is a flow chart explanatory of steps of learning procedure followed in the waveform evaluating apparatus 1 of the third embodiment.

Operation of the third embodiment will be described below. The waveform evaluating apparatus 1 of the third embodiment is adapted to make advance learning for waveform evaluation prior to the execution of the waveform evaluation. Therefore, the steps for learning in the waveform evaluating apparatus 1 will be described with reference to FIG. 22.

The learning is started at step 1 (hereinafter briefly referred to as S1, etc.), i.e., control/computing portion 27 makes switching so that the input waveform is led to the training conducting system A. Then, in S2, waveform data to be collected from the object of measurement 10 is input to the waveform statistically processing portion 21. Thereupon, the waveform statistically processing portion 21 performs statistical processing of the waveform and generates an ideal waveform. In S3, the waveform to be collected by the waveform statistically processing portion 21 is determined and it is collected.

In S4, the teacher waveform determining portion 22 determines a first teacher waveform on the basis of the ideal waveform and, further, a second and a third teacher waveform are determined according to waveforms requiring adjustments and arranged so as to sandwich the first teacher waveform therebetween.

Then, the learning with the determined teacher waveforms is started. First in S5, initial setting of the neural weight ratio is performed. Then, in S6, the evaluation function at the output layer in the state where the first ideal waveform module is zero input is calculated. In S7, it is decided whether or not the evaluation function value is within a predetermined range. When it is within the predetermined range, in the following S8, it is decided whether or not the learning with all of the teacher waveforms is finished. When the evaluation function value calculated in S6 is outside the predetermined range in S7, the flow of routine moves to S9 and therein the correction amount of the neural weight ratio is calculated. Then, in S10, the neural weight ratio is corrected according to the neural weight ratio correction amount obtained in S9. Thereafter, the flow returns to S6 and therein the evaluation function is calculated again. Execution of this routine is repeated until the neural weight ratio allowing the evaluation function value to come within the predetermined range is determined.

When it is decided that the learning with all of the teacher waveforms is finished in S8, the flow advances to S11 and therein the learning is ended. When it is decided that the learning with all of the teacher waveforms has not yet been finished in S8, the flow moves to S12 and, therein, the teacher waveform is changed, and then the flow returns to S5 and the learning is further made.

Operation of the waveform evaluating apparatus 1 of the third embodiment arranged as described above and performing waveform adjustments with the use of the neural network finished with the advance learning will be described below.

As shown in FIG. 23, the waveform adjustment is started at step 1 (hereinafter briefly referred to as S1, etc.), i.e., the control/computing portion 27 make switching such that the input waveform is led to the waveform evaluating system B. Then, in S2, the waveform collecting portion 25 makes waveform collection from the object of measurement 10 and, in the following S3, waveform evaluation is performed. More specifically, waveform data are from time to time input to the neural network 231 finished with the learning, and the volume etc. of the object of judgment 10 are adjusted while the output values of the neural network 231 displayed on the displaying portion 28 is checked. In S4, it is decided whether or not the evaluation adjustment value is within the predetermined range, and if it is within the predetermined range, the adjustment and evaluation is ended in S5. When it is decided that the evaluation adjustment value is not within the predetermined range, the volume etc. of the object of judgment 10 are adjusted in S6 so that the input waveform is changed, and the flow is returned to S2, from where the adjustment and evaluation is performed again. It is also possible to display data of the waveform statistically processing portion 21, teacher waveform determining portion 22, and waveform collecting portion 25 on the displaying portion 28.

When a waveform finished with the adjustment is subjected to an environment test (aging) or the like, the input data to the input layer being the waveform finished with the adjustment is stored in a storage portion, and if the stored data in the storage portion is learned again as the first teacher waveform, such a merit is obtained that the effect by changes in the environmental test or the like can be quantified as a numeric value. Further, such an excellent merit is obtained that the present embodiment can be applied to evaluation of waveforms, testing apparatuses, or the like.

Further, if the waveform data before an environmental test is re-established as a teacher signal being an ideal waveform and the neural network 231 is made to learn it anew and if evaluation is performed once again after the environmental test, such a meritorious effect is obtained that the change during the environmental test can be known accurately.

Further, if waveform evaluation is performed after re-establishing the waveform data which was obtained following an environmental test as a teacher signal being an ideal waveform and causing the neural network 231 to learn it, then aged deterioration or the like can be checked, and thus highly reliable wave evaluation can be achieved.

Figure 24A:
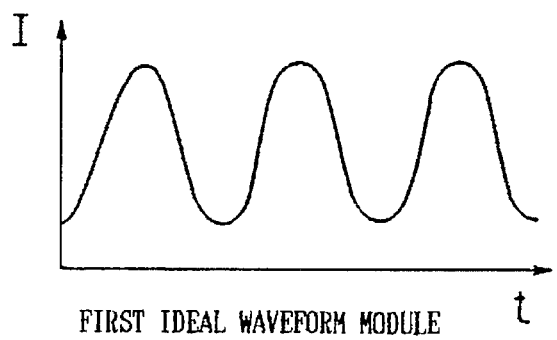
FIGS. 24(a), 24(b), 24(c) are diagrams explanatory of a case where the waveform evaluating apparatus 1 of the third embodiment performs phase adjustment.
Figure 24B:
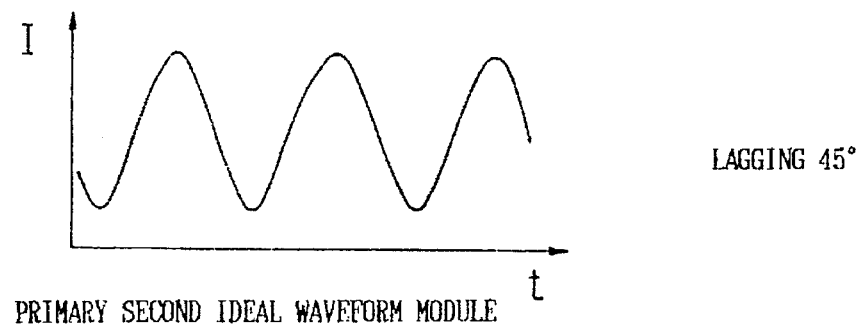
Figure 24C:
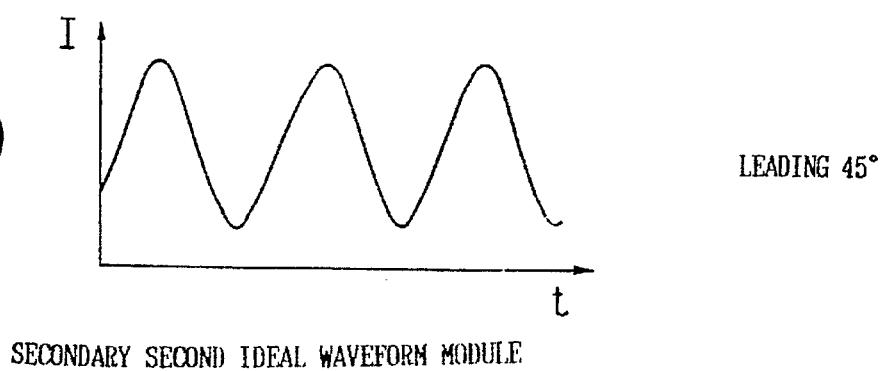

Although the present embodiment was described above as to the cases, by way of examples, where the amplitude of waveform was adjusted therein, other attributes than amplitude such as phase can be adjusted and evaluated. When for example a phase adjustment is performed, if the waveform shown in FIG. 24(a) is established as a first teacher waveform being an ideal waveform, the waveform lagging in phase by 45° (FIG. 24(b)) is established as a second teacher waveform, and further the waveform leading in phase by 45° (FIG. 24(c)) is established as a third teacher waveform, then the first teacher waveform being an ideal waveform is sandwiched between the second teacher waveform and the third teacher waveform. Therefore, if such teacher signals are established and the neural network are made to learn them, adjustment and evaluation of the phase can be achieved as was the case with the amplitude.

The third embodiment arranged as described above is structured of at least three layers of the input layer, the hidden layer, and the output layer, and it is adapted such that signal waveform data as the object of evaluation is input as an input signal to the input layer of the neural network having a neural weight ratio and an analog output is output from the output layer. The neural network is made to learn with the first teacher waveform as the ideal waveform and also to learn with the second and third teacher waveforms disposed so as to sandwich the first teacher waveform therebetween as waveforms requiring adjustments and, thereby, the neural weight ratio of the neural network is determined. Therefore, such a meritorious effect is obtained that even a waveform including a large amount of noises can be evaluated without personal error and quantitatively by converting the adjustment quantity into a numerical value. Also, such a merit can be obtained that the change in the waveform after an environmental test or the like has been conducted can be evaluated quantitatively.

Further, the third embodiment is adapted such that the storage portion stores the input data at the input layer when the adjustment according to the output results of the output layer is finished. Hence, when revaluation is performed after the adjustment is finished and aging (environmental test) has been applied, the input data stored in the storage portion can be used as the first teacher signal to be learned again, an excellent effect can be obtained that the change during the environmental test can be known.

What is claimed is:

1. A waveform evaluating apparatus using a neural network comprising:

a plurality of neural network modules each being made up of at least an input layer, a hidden layer, and an output layer, connected in the neural network having the neural weight ratio;

first means for providing a first predetermined output value by inputting a first standard waveform to said neural network module, said first means including means for adjusting said neural weight ratio;

second means for providing a second predetermined output value by inputting a second standard waveform to said neural network module, said second means including means for adjusting said neural weight ratio, said first standard waveform being predeterminedly preferred to said second standard waveform;

means for producing a third output value in response to inputting an input waveform to said neural network, wherein said third output value's closeness to said first and second predetermined output value is ascertainable; and a signal extracting portion disposed in said input layer for extracting a signal which is in phase with the first standard waveform, wherein said signal extracting portion supplies the extracted signal to said input layer as an input waveform for said neural network;

wherein said signal extracting portion is formed of a phase detecting portion for detecting phasic information and a waveform slicing portion for performing waveform slicing using the phasic information detected by said phase detecting portion.

2. A waveform evaluating apparatus using a neural network according to claim 1, wherein said signal extracting portion including means for detecting phasic information, said detecting means including a selected one of correlative processing means and another neural network.

* * * * *